(12) United States Patent
Lee et al.

(10) Patent No.: US 12,216,499 B2
(45) Date of Patent: Feb. 4, 2025

(54) DISPLAY DEVICE

(71) Applicant: Samsung Display Co., LTD., Yongin-si (KR)

(72) Inventors: Jong Hyun Lee, Cheonan-si (KR); Yun Jae Kim, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 257 days.

(21) Appl. No.: 17/986,064

(22) Filed: Nov. 14, 2022

(65) Prior Publication Data

US 2023/0244272 A1 Aug. 3, 2023

(30) Foreign Application Priority Data

Jan. 28, 2022 (KR) .......................... 10-2022-0012765

(51) Int. Cl.
*G06F 1/16* (2006.01)

(52) U.S. Cl.
CPC .......... *G06F 1/1643* (2013.01); *G06F 1/1616* (2013.01); *G06F 1/1652* (2013.01); *G06F 1/1656* (2013.01)

(58) Field of Classification Search
CPC combination set(s) only.
See application file for complete search history.

(56) References Cited

U.S. PATENT DOCUMENTS

| | | | | |
|---|---|---|---|---|
| 11,592,951 B2* | 2/2023 | Kishimoto | ............. | H10K 77/10 |
| 11,656,655 B2* | 5/2023 | Shin | ...................... | G06F 1/1643 |
| | | | | 361/679.27 |
| 11,812,655 B2* | 11/2023 | Cho | ...................... | H10K 59/131 |
| 11,868,176 B2* | 1/2024 | Shin | ....................... | G06F 1/1616 |
| 11,943,879 B2* | 3/2024 | Shin | ....................... | G06F 3/046 |
| 2020/0401275 A1* | 12/2020 | Shin | ....................... | G06F 3/0445 |
| 2021/0105894 A1* | 4/2021 | Oh | ........................ | H05K 1/0281 |
| 2022/0044599 A1* | 2/2022 | La | ........................... | G06F 1/1641 |
| 2022/0147102 A1* | 5/2022 | Kishimoto | ............. | G06F 1/1656 |
| 2022/0164045 A1* | 5/2022 | Kishimoto | ............. | C09J 183/04 |

(Continued)

FOREIGN PATENT DOCUMENTS

| KR | 1020200006646 | 1/2020 |
|---|---|---|
| KR | 1020200014459 | 2/2020 |

(Continued)

*Primary Examiner* — Lisa Lea-Edmonds
(74) *Attorney, Agent, or Firm* — CANTOR COLBURN LLP

(57) ABSTRACT

A foldable device includes: a display panel; a digitizer disposed on a surface of the display panel and comprising a base layer, first conductive patterns disposed between the base layer and the display panel, and second conductive patterns disposed on an opposite side to the first conductive patterns with the base layer interposed therebetween; a first adhesive member disposed between the digitizer and the display panel and in direct contact with the digitizer; and a second adhesive member disposed on an opposite side to the first adhesive member with the digitizer interposed therebetween and in direct contact with the digitizer. The digitizer further defines a digitizer hole penetrating through the digitizer, and the base layer comprises a protrusion having a shape protruding from an edge of the base layer located at a shortest distance from the digitizer hole toward an outside of the base layer.

20 Claims, 19 Drawing Sheets

(56) References Cited

U.S. PATENT DOCUMENTS

| | | | |
|---|---|---|---|
| 2022/0187979 A1* | 6/2022 | Jung | G06F 3/04166 |
| 2022/0238821 A1* | 7/2022 | Cho | H10K 59/87 |
| 2022/0253100 A1* | 8/2022 | Park | G06F 1/1681 |
| 2022/0291716 A1* | 9/2022 | Kishimoto | B32B 27/36 |
| 2022/0397972 A1 | 12/2022 | Yoo et al. | |
| 2022/0407219 A1* | 12/2022 | An | H04M 1/0268 |
| 2023/0030438 A1* | 2/2023 | Kim | G06F 1/1652 |
| 2023/0156947 A1* | 5/2023 | Jo | G06F 1/16 |
| | | | 361/807 |
| 2023/0244271 A1* | 8/2023 | Shin | G06F 1/1652 |
| | | | 361/679.27 |
| 2023/0244272 A1* | 8/2023 | Lee | G06F 1/1652 |
| | | | 361/679.01 |
| 2023/0266799 A1* | 8/2023 | Kim | G06F 1/1637 |
| | | | 345/156 |

FOREIGN PATENT DOCUMENTS

| | | |
|---|---|---|
| KR | 1020210086907 | 7/2021 |
| KR | 1020220167846 | 12/2022 |

* cited by examiner

AD3_b

DISPLAY DEVICE

This application claims priority to Korean Patent Application No. 10-2022-0012765, filed on Jan. 28, 2022, and all the benefits accruing therefrom under 35 U.S.C. § 119, the content of which in its entirety is herein incorporated by reference.

BACKGROUND

1. Field of the Disclosure

The present disclosure relates to a foldable display device.

2. Description of the Related Art

As the information-oriented society evolves, various demands for a display device are ever increasing. For example, the display device is being employed by a variety of electronic devices such as smart phones, digital cameras, laptop computers, navigation devices, and smart televisions.

In order to increase portability of the display device and provide a wider display screen, a bendable display device in which the display area can be bent, or a foldable display device in which the display area can be folded is being released.

In addition, the display device supports touch input using an electronic pen (e.g., a stylus pen) as well as a touch input using a part of a user's body (e.g., a finger). By using a touch input with an electronic pen, the display device can sense the touch input more precisely than a display device using only a touch input by a part of the user's body.

SUMMARY

Aspects of the present disclosure provide a foldable display device that can prevent permeation of moisture near a camera hole of a digitizer with a simple structure.

It should be noted that aspects of the present disclosure are not limited to the above-mentioned aspect; and other aspects of the present disclosure will be apparent to those skilled in the art from the following descriptions.

According to an embodiment of the disclosure, a foldable display device includes: a display panel, a digitizer disposed on a surface of the display panel and comprising a base layer, a plurality of first conductive patterns disposed between the base layer and the display panel, and a plurality of second conductive patterns disposed on an opposite side to the first conductive patterns with the base layer interposed therebetween, a first adhesive member disposed between the digitizer and the display panel and in direct contact with the digitizer, and a second adhesive member disposed on an opposite side to the first adhesive member with the digitizer interposed therebetween and in direct contact with the digitizer. The digitizer further includes a digitizer hole penetrating through the digitizer, a first step-covering pattern disposed in the same layer with the first conductive patterns, and a second step-covering pattern disposed in the same surface with the second conductive patterns, the first adhesive member defines a first adhesive member hole penetrating through the first adhesive member and in line with the digitizer hole in a thickness direction, and the second adhesive member defines a second adhesive member hole penetrating through the second adhesive member and in line with the digitizer hole in the thickness direction.

The first step-covering pattern may be disposed between two adjacent first conductive patterns of the plurality of first conductive patterns, and the second step-covering pattern is disposed between two adjacent second conductive patterns of the plurality of second conductive patterns.

The first step-covering pattern may be spaced apart from the first conductive pattern, and the second step-covering patterns may be spaced apart from the second conductive patterns.

The first step-covering pattern may include the same material as the first conductive patterns, and the second step-covering pattern includes the same material as the second conductive patterns.

A surface of the first step-covering pattern may be in direct contact with the base layer while an opposite surface of the first step-covering pattern is in direct contact with the first adhesive member, and a surface of the second step-covering pattern may be in direct contact with the base layer while an opposite surface of the second step-covering pattern is in direct contact with the second adhesive member.

The opposite surface of the first step-covering pattern may have a flat shape, and the opposite surface of the second step-covering pattern may have a flat shape.

The first step-covering pattern and the first conductive patterns may have the same thickness, and the second step-covering pattern and the second conductive patterns may have the same thickness.

A shortest distance from the first step-covering pattern to the adjacent first conductive patterns may be about 1 to about 8 micrometers (μm), and a shortest distance from the second step-covering pattern to the adjacent second conductive patterns may be about 1 to about 8 μm.

A side surface of the first step-covering pattern may be in direct contact with a side surface of at least one of the adjacent first conductive patterns, and a side surface of the second step-covering pattern may be in direct contact with a side surface of at least one of the adjacent second conductive patterns.

Each of the first step-covering pattern and the second step-covering pattern may include an insulating material.

The first step-covering pattern and the first conductive pattern may have the same thickness, and the second step-covering pattern and the second conductive pattern may have the same thickness.

The base layer may include a protrusion having a shape protruding from an edge of the base layer located at a shortest distance from the digitizer hole toward an outside of the base layer.

The foldable display device may further include: a panel support disposed between the display panel and the digitizer, and a metal support disposed on a surface of the panel support with the digitizer interposed therebetween. The panel support may define a panel support hole that penetrates through the panel support and is in line with the digitizer hole in the thickness direction, and the metal support may define a metal support hole that penetrates through the metal support and is in line with the digitizer hole in the thickness direction.

The foldable display may further include: a barrier member disposed between the display panel and the digitizer. The barrier member may define a barrier member hole that penetrates through the barrier member and is in line with the digitizer hole in the thickness direction.

According to an embodiment of the disclosure, a foldable display device includes: a display panel, a digitizer disposed on a surface of the display panel and including a base layer, a plurality of first conductive patterns disposed between the base layer and the display panel, and a plurality of second conductive patterns disposed on an opposite side to the first conductive patterns with the base layer interposed therebetween, a first adhesive member disposed between the digitizer and the display panel and in direct contact with the digitizer, and a second adhesive member disposed on an opposite side to the first adhesive member with the digitizer interposed therebetween and in direct contact with the digitizer. The digitizer defines a digitizer hole penetrating through the digitizer, the first adhesive member defines a first adhesive member hole that penetrates through the first adhesive member and is in line with the digitizer hole in a thickness direction, the second adhesive member defines a second adhesive member hole that penetrates through the second adhesive member and is in line with the digitizer hole in the thickness direction, and each of the first adhesive member and the second adhesive member may have a thickness of about 15 to about 50 μm.

A surface of each of the first conductive patterns may be in direct contact with the base layer, and the first adhesive member may cover a remaining surface of each of the first conductive patterns, and a surface of each of the second conductive patterns may be in direct contact with the base layer, and the second adhesive member may cover a remaining surface of each of the second conductive patterns.

The base layer may include a protrusion having a shape protruding from an edge of the base layer located at a shortest distance from the digitizer hole toward an outside of the base layer.

According to an embodiment of the disclosure, a foldable display device includes: a display panel, a digitizer disposed on a surface of the display panel and including a base layer, a plurality of first conductive patterns disposed between the base layer and the display panel, and a plurality of second conductive patterns disposed on an opposite side to the first conductive patterns with the base layer interposed therebetween, a first adhesive member disposed between the digitizer and the display panel and in direct contact with the digitizer, and a second adhesive member disposed on an opposite side to the first adhesive member with the digitizer interposed therebetween and in direct contact with the digitizer. The digitizer defines a digitizer hole penetrating through the digitizer, and the base layer includes a protrusion having a shape protruding from an edge of the base layer located at a shortest distance from the digitizer hole toward an outside of the base layer.

The foldable display may further include a panel support disposed between the display panel and the digitizer. A side surface of the protrusion may be disposed more inward than a side surface of the panel support corresponding thereto in a view in a thickness direction.

The panel support may define a panel support hole that penetrates through the panel support and overlaps with the digitizer hole in the thickness direction, and an edge of the panel support located at a shortest distance from the panel support hole may have a shape protruding outward from the panel support hole.

According to embodiments of the present disclosure, a step-covering pattern may be disposed between conductive patterns. By virtue of the step-covering pattern, it is possible to reduce level differences near a camera hole in the upper and lower surfaces of a digitizer. Accordingly, it is possible to achieve sufficient adhesion strength between adhesive members and the upper and lower surfaces of the digitizer. In this manner, it is possible to prevent a problem that outside moisture permeates into a foldable display device, which may arise if the adhesive members are separated from the digitizer near the camera hole in the upper and lower surfaces of the digitizer.

In the foldable display according to the embodiments, the thicknesses of the adhesive members in direct contact with the upper and lower surfaces of the digitizer can be increased. By doing so, the adhesive members can sufficiently cover the level differences near the camera hole in the upper and lower surfaces of the digitizer.

The digitizer of the foldable display according to the embodiments may include a protrusion that is adjacent to the camera hole and protrudes outward. In this manner, it is possible to obtain a sufficient area where the adhesive members and the digitizer are attached together.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be. The same reference numbers indicate the same components throughout the specification. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, embodiments of the present disclosure will be described with reference to the accompanying drawings.

Figure 1:
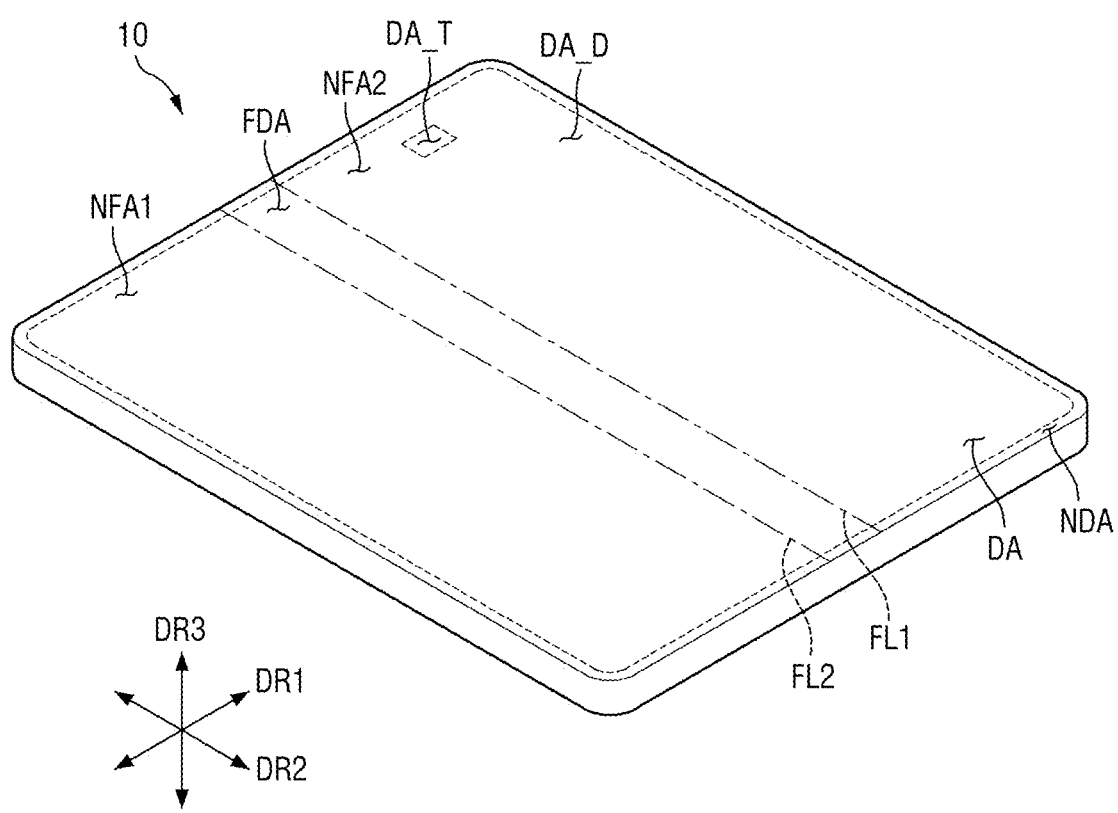
FIGS. 1 and 2 are perspective views showing a display device according to an embodiment of the present disclosure.
Figure 2:
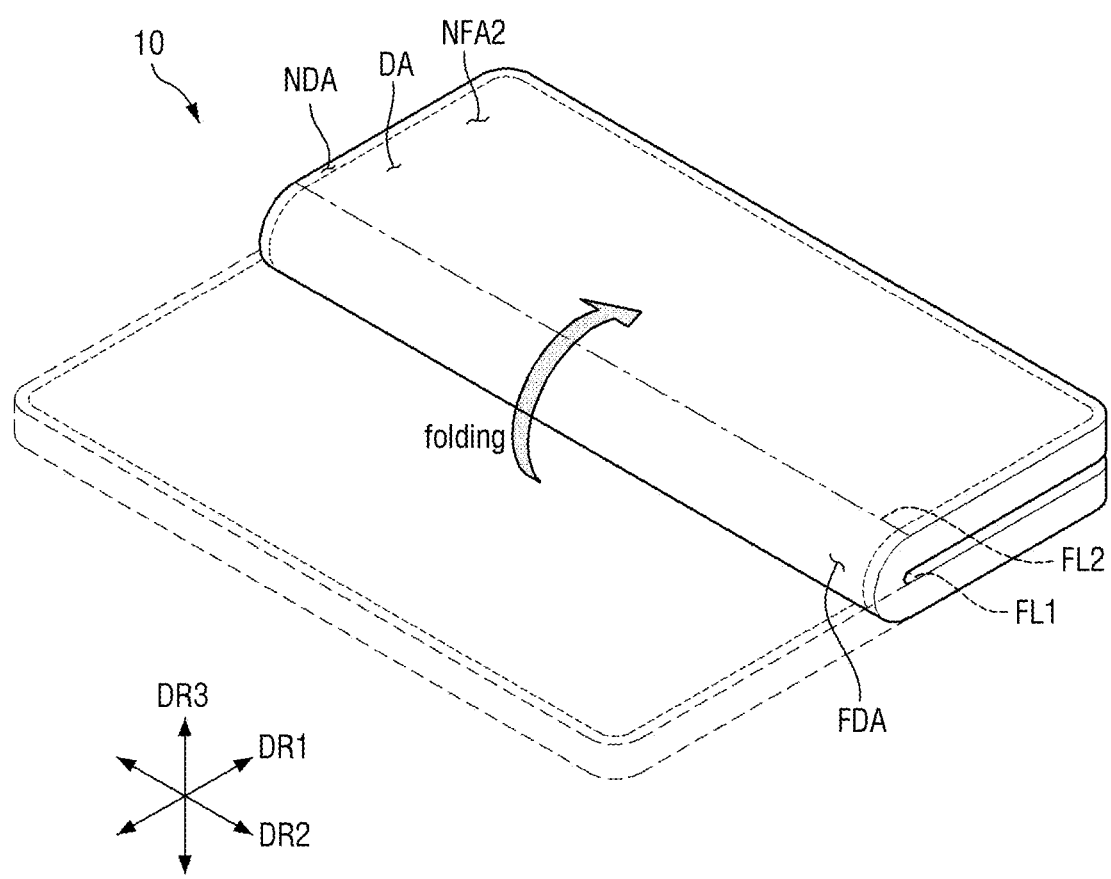
Figure 3:
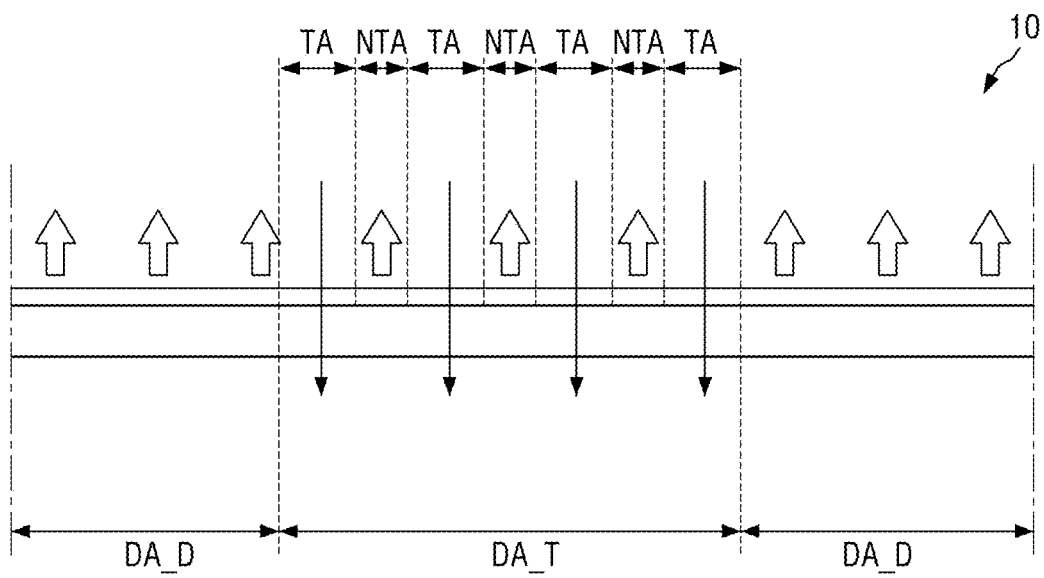
FIG. 3 is a cross-sectional view of a part of a display device according to an embodiment of the present disclosure.

FIGS. 1 and 2 are perspective views showing a foldable display device according to an embodiment of the present disclosure. FIG. 3 is a cross-sectional view of a part of a display device according to an embodiment of the present disclosure.

FIG. 1 shows a first state of the foldable display device when it is unfolded without being bent along folding lines, and FIG. 2 shows a second state of the foldable display device when it is bent along the folding lines.

Referring to FIGS. 1 to 2, a foldable display device 10 according to an embodiment of the present disclosure is for displaying moving images or still images. The display device 1 may be used as the display screen of portable electronic devices such as a mobile phone, a smart phone, a tablet PC, a smart watch, a watch phone, a mobile communications terminal, an electronic notebook, an electronic book, a portable multimedia player ("PMP"), a navigation device and an ultra mobile PC ("UMPC"), as well as the display screen of various products such as a television, a notebook, a monitor, a billboard and the Internet of Things.

As shown in FIGS. 1 and 2, a first direction DR1 may refer to a direction parallel to a side of the display device 10, for example, the horizontal direction of the display device 10 when viewed from the top (i.e., in a plan view). A second direction DR2 may refer to a direction parallel to another side of the display device 10 that meet the side of the display device 10, for example, the vertical direction of the display device 10 when viewed from the top. A third direction DR3 may refer to the thickness direction of the display device 10.

The display device 10 may have a quadrangular shape, such as a rectangular shape when viewed from the top. Each of the corners of the display device 10 may form a right angle or may be rounded when viewed from the top. The upper surface of the display device 10 may include two shorter sides extended in the first direction DR1 and two longer sides extended in the second direction DR2.

The display device 10 includes a display area DA and a non-display area NDA. The shape of the display area DA may follow the shape of the display device 10 when viewed from the top (i.e., in the third direction DR3). For example, when the display device 10 has a rectangular shape when viewed from the top, the display area DA may also have a rectangular shape when viewed from the top.

The display area DA may include a plurality of pixels to display images. The non-display area NDA may not include pixels and thus may not display images. The non-display area NDA may be disposed around the display area DA. The non-display area NDA may surround the display area DA, but the embodiments of the present disclosure are not limited thereto. In another embodiment, the display area DA may be partially surrounded by the non-display area NDA.

The display device 10 may stay either in a first state when it is an unfolded state or a second state when it is a bent state. The display device 10 may be folded inward so that a part of the display device DA faces the other part (in-folding manner), as shown in FIG. 2. In this instance, a part of the upper surface of the display device 10 may face the other part, but the present disclosure is not limited thereto. In another embodiment, for example, the display device 10 may be folded outward so that a part of the lower surface of the display device 10 faces the other part (out-folding manner).

The display device 10 may include a folding area FDA, a first non-folding area NFA1, and a second non-folding area NFA2. The display device 10 can be bent or folded at the folding area FDA, while it cannot be bent or folded at the first non-folding area NFA1 and the second non-folding area NFA2. That is to say, the first non-folding area NFA1 and the second non-folding area NFA2 may be flat areas of the display device 10.

The first non-folding area NFA1 may be disposed on one side, for example, the left side of the folding area FDA. The second non-folding area NFA2 may be disposed on the opposite side, for example, the right side of the folding area FDA. The folding area FDA may be defined by the first folding line FL1 and the second folding line FL2, where the display device 10 can be bent with a predetermined curvature. The first folding line FL1 may be the boundary between the folding area FDA and the first non-folding area NFA1, and the second folding line FL2 may be the boundary between the folding area FDA and the second non-folding area NFA2.

The first folding line FL1 and the second folding line FL2 may be extended in the first direction DR1 as shown in FIGS. 1 and 2, and the display device 10 may be folded in the second direction DR2. Accordingly, the length of the display device 10 in the second direction DR2 may be reduced to about half, so that the display device 10 is easy to carry.

When the first folding line FL1 and the second folding line FL2 are extended in the second direction DR2 as shown in FIGS. 1 and 2, the length of the folding area FDA in the second direction DR2 may be larger than the length in the first direction DR1. In addition, the length of the first non-folding area NFA1 in the second direction DR2 may be larger than the length of the first non-folding area NFA1 in the first direction DR1. The length of the second non-folding area NFA2 in the second direction DR2 may be larger than the length of the second non-folding area NFA2 in the first direction DR1.

Each of the display area DA and the non-display area NDA may overlap at least one of the folding area FDA, the first non-folding area NFA1, and the second non-folding area NFA2 in a plan view. In the example shown in FIGS. 1 and 2, each of the display area DA and the non-display area NDA overlaps the folding area FDA, the first non-folding area NFA1 and the second non-folding area NFA2.

Referring to FIGS. 1 and 3, the display area DA may include a first display area DA and a second display area DA having different light transmittances. The first display area DA and the second display area DA may be divided based on whether a light-transmitting area TA is included. For example, the display area DA may include a display-only area DA_D that is the first display area DA, and a transmissive display area DA_T that is the second display area DA. The display-only area DA_D may include no light-transmitting area TA, whereas the transmissive display area DA_T may include the light-transmitting areas TA. The display area DA may include one transmissive display area DA_T, but the present disclosure is not limited thereto. In another embodiment, the display area DA may include a plurality of transmissive areas DA_T separated from one another.

The display-only area DA_D may be located around the transmissive display area DA_T. The display-only area DA_D may partially or entirely surround the transmissive display area DA_T. The display-only area DA_D and the transmissive display area DA_T may be contiguous to each other and may be extended continuously without being physically separated. According to an embodiment, the display-only area DA_D and the transmissive display area DA_T cannot be distinguished by the naked eyes, but the present disclosure is not limited thereto.

The location of the transmissive display area DA_T is not particularly in the display area DA. For example, the transmissive display area DA_T may be spaced apart from the non-display area NDA and may be surrounded by the display area DA. Alternatively, the transmissive display area DA_T may be located adjacent to an edge of the display area DA and may be in contact with the non-display area NDA.

The transmissive display area DA_T may further include a light-transmitting area TA and a non-transmitting area NTA having different light transmittances. The light transmittance of the light-transmitting area TA may be greater than that of the non-transmitting area NTA.

The light-transmitting area TA does not emit light and transmit light in the thickness direction. The light may include not only light in the visible wavelength but also light in the near infrared and/or infrared wavelength. The light transmitted by the light-transmitting area TA may further include light in the near-ultraviolet and/or ultraviolet wavelength ranges.

The non-transmitting area NTA emits light and does not transmit most of the lights in the thickness direction. That is to say, the non-transmitting area NTA may transmit a smaller amount of external light than the light-transmitting area TA.

The non-transmissive area NTA may be disposed in the transmissive display area DA_T except the light-transmitting area TA, but the present disclosure is not limited thereto. In another embodiment, for example, the non-transmitting area NTA may be disposed in the display-only area DA_D as well as in the transmissive display area DA_T.

Since the transmissive display area DA_T further includes the light-transmitting area TA compared to the display-only area DA_D, the density of the pixels PX or the like may be different, which relates to the resolution. For example, the resolution of the transmissive display area DA_T may be lower than that of the display-only area DA_D, but the present disclosure is not limited thereto.

Figure 4:
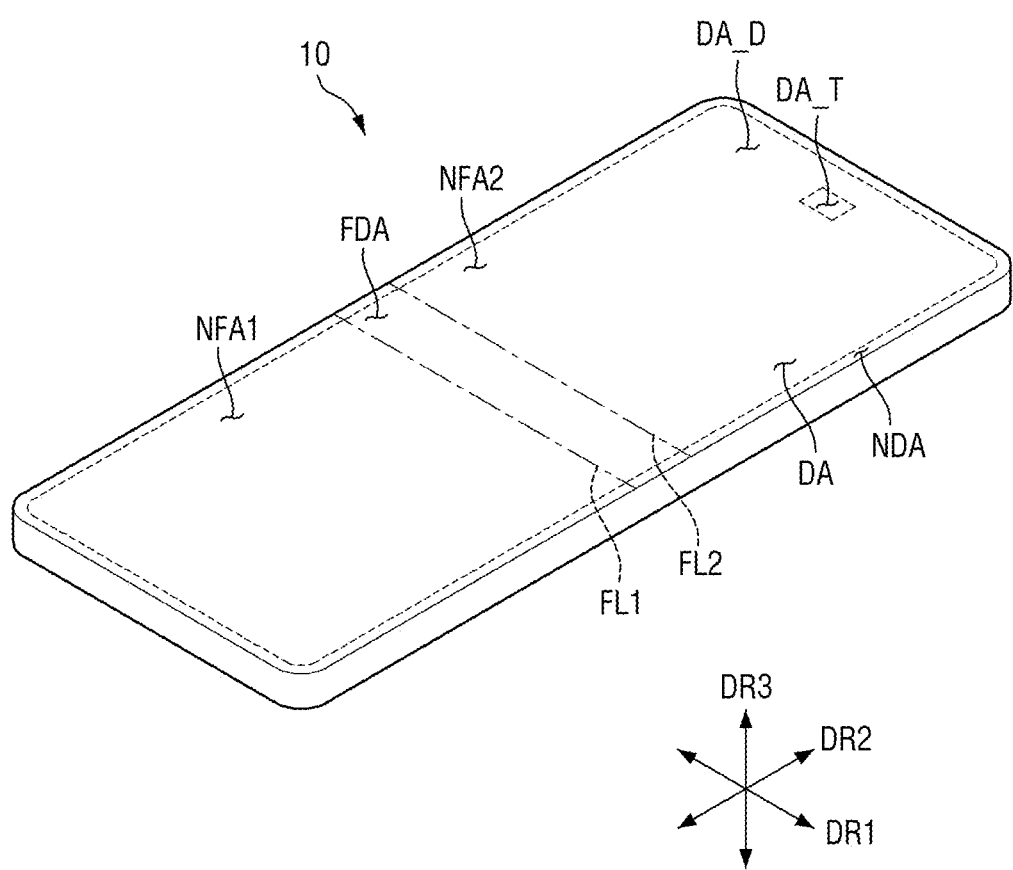
FIGS. 4 and 5 are perspective views showing a display device according to still another embodiment.
Figure 5:
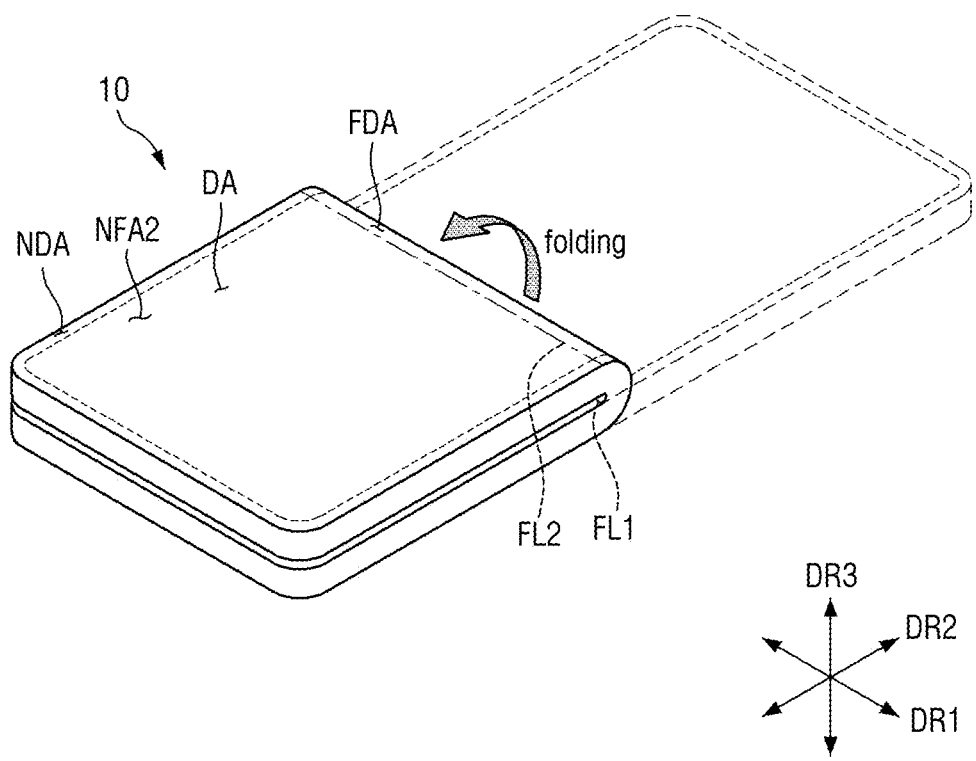

FIGS. 4 and 5 are perspective views showing a display device according to still another embodiment. FIG. 4 is a perspective view showing a display device according to yet another embodiment of the present disclosure when it is unfolded. FIG. 5 is a perspective view showing the display device according to the embodiment of the present disclosure when it is folded.

The embodiment of FIGS. 4 and 5 is substantially identical to the embodiment of FIGS. 1 and 2 except that a first folding line FL1 and a second folding line FL2 are extended in the first direction DR1 and a display device 10 can be folded in the second direction DR2, so that the length of the display device 10 in the second direction DR2 can be reduced by approximately half. Therefore, the elements of FIGS. 4 and 5 identical to those of FIGS. 1 and 2 will not be described to avoid redundancy.

Referring to FIGS. 4 and 5, the first non-folding area NFA1 may be disposed on one side, for example, the lower side of the folding area FDA. The second non-folding area NFA2 may be disposed on the opposite side, for example, the upper side of the folding area FDA. When the first folding line FL1 and the second folding line FL2 are extended in the first direction DR1 as shown in FIGS. 4 and 5, the length of the folding area FDA in the first direction DR1 may be larger than the length in the second direction DR2.

Figure 6:
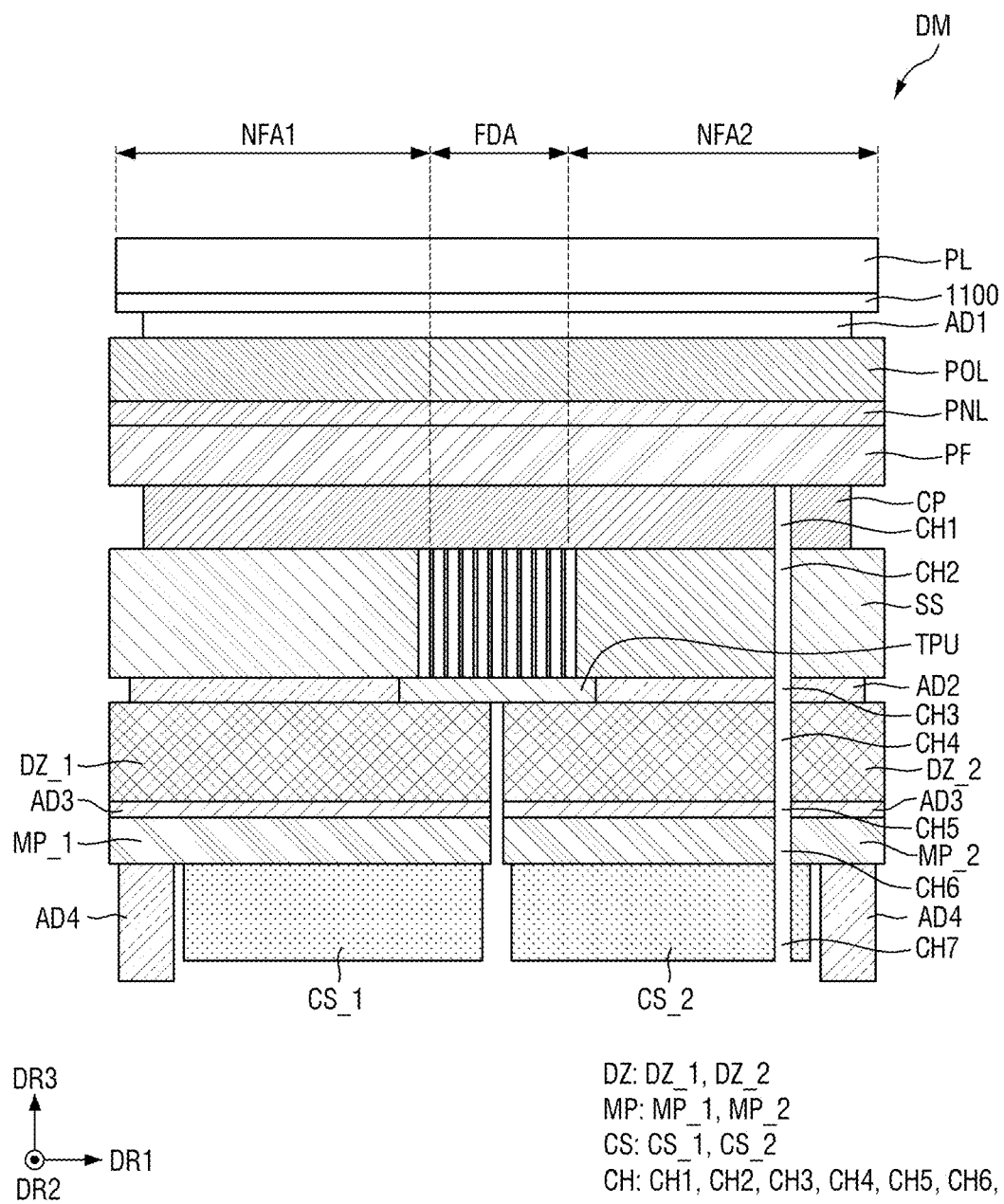
FIG. 6 is a side view of a display module of the display device according to the embodiment of FIG. 1.

FIG. 6 is an exploded, perspective view of a display module of the display device according to the embodiment of FIG. 1.

Referring to FIG. 6, the display device 10 according to an embodiment may include a display module DM. The display module DM may include an upper protective film PL, a window 1100, a first adhesive member AD1, a polarizing member POL, a display panel PNL, a panel bottom member PF, a barrier member CP, a panel support SS, a second adhesive member AD2, a digitizer DZ, a third adhesive member AD3, a metal support MP, a cushion member CS, and a fourth adhesive member AD4. In the claims, one side of an element in the third direction DR3 may be recited as the upper side while the opposite side of the element in the third direction DR3 may be recited as the lower side.

The first non-folding area NFA1, the folding area FDA and the second non-folding area NFA2 of the display device 10 may also be applied to the display module DM, i.e., the upper protective film PL, the window 1100, the first adhesive member AD1, the display panel PNL, the panel bottom member PF, the barrier member CP, the panel support SS, the second adhesive member AD2, the digitizer DZ, the third adhesive member AD3, the metal support MP and the cushion member CS. For example, a portion of the display panel PNL overlapping the first non-folding area NFA1 of the display device 10 in the third direction DR3 may be a first flat portion of the display panel PNL, a portion of the display panel PNL overlapping the folding area FDA of the display device 10 in the third direction DR3 may be a first bending portion of the display panel PNL, and a portion of the display panel PNL overlapping the second non-folding area NFA2 of the display device 10 may be a second flat portion of the display panel PNL.

Likewise, the first display area DA1, the first non-display area NDA1, the second display area DA2 and the second non-display area NDA2 of the display device 10 may also be applied to the upper protective film PL, the window 1100, the first adhesive member AD1, the display panel PNL, the panel bottom member PF, the barrier member CP, the panel support SS, the second adhesive member AD2, the digitizer DZ, the metal support MP and the cushion member CS.

The upper protective film PL may perform at least one of functions of anti-scattering when the window 1100 is broken, shock absorption, anti-scratch, anti-fingerprint, and anti-glare, which will be described later. The upper protective film PL may be disposed on one surface of the window 1100 in the third direction DR3 (hereinafter referred to as upper surface). The upper protective film PL may be attached to the upper surface of the window 1100 by an adhesive member such as a pressure-sensitive adhesive.

The window 1100 can protect the display panel PNL from the outside, which will be described later. The window 1100 may be disposed on a surface of the polarizing member POL in the third direction DR3 (hereinafter referred to as the upper surface). The window 1100 may be made of a transparent material, for example, glass or plastic. For example, the window 1100 may be an ultra-thin glass ("UTG") having a thickness of 0.1 millimeters (mm) or less or a transparent polyimide film.

The window 1100 may be attached to the upper surface of the polarizing member POL by the first adhesive member AD1. The first adhesive member AD1 may be a transparent adhesive film or a transparent adhesive resin.

The polarizing member POL may polarize light emitted from the display panel PNL or polarize light incident on the display panel PNL. The polarizing member POL may be disposed on a surface (hereinafter referred to as the upper surface) of the display panel PNL in the third direction DR3.

The polarizing member POL may be omitted in some implementations. When the polarizing member POL is omitted, the window 1100 may be attached on the upper surface of the display panel PNL by the first adhesive member AD1.

The display panel PNL displays images thereon. Any kind of display panel may be employed as the display panel PNL according to the embodiment, such as an organic light-emitting display panel including an organic light-emitting layer, a micro light-emitting diode display panel using micro LEDs, a quantum-dot light-emitting display panel using quantum-dot light-emitting diodes including quantum-dot light-emitting layer, or an inorganic light-emitting display panel using inorganic light-emitting elements including an inorganic semiconductor. Referring to FIG. 1, the display panel PNL may display images on one side in the third direction DR3.

The panel bottom member PF can support the display panel PNL and protect the lower surface of the display panel PNL. The panel bottom member PF may be disposed on the opposite surface of the display panel PNL in the third direction DR3 (hereinafter referred to as lower surface). The panel bottom member PF may be a plastic such as polyethylene terephthalate and polyimide. Although the panel bottom member PF is disposed in the folding area FDA of the display device 10 in the example of FIG. 6, the embodiments of the present disclosure are not limited thereto. In another embodiment, for example, a panel protective member TPU may be removed from the folding area FDA of the display device 10 to allow the display device 10 to be smoothly folded, and may be disposed only in the first non-folding area NFA1 and the second flat portion PP1.

The barrier member CP may be disposed on the opposite surface of the panel bottom member PF in the third direction DR3 (hereinafter referred to as the lower surface). The barrier member CP may include at least one of: a light-blocking layer for absorbing light incident from outside, a buffer layer for absorbing external shock, and a heat-dissipating layer for efficiently discharging heat from the display panel PNL.

The light-blocking layer blocks the transmission of light to prevent the elements disposed under the light-blocking layer from being seen from the upper surface of the display panel PNL, such as a digitizer to be described later. The light-blocking layer may include a light-absorbing material such as a black pigment and a black dye.

The buffer layer absorbs an external shock to prevent the display panel PNL from being damaged. The buffer layer may be made up of a single layer or multiple layers. In an embodiment, for example, the buffer layer may be formed of a polymer resin such as polyurethane, polycarbonate, polypropylene and polyethylene, or an elastic material such as a rubber, and a sponge formed by foaming a urethane-based material or an acrylic-based material.

The heat-dissipating layer may include a first heat dissipation layer including graphite or carbon nanotubes, and a second heat dissipation layer formed of a thin metal film such as copper, nickel, ferrite and silver, which can block electromagnetic waves and have high thermal conductivity.

The panel support SS can support the lower surface of the display panel PNL. The panel support SS may be disposed on the opposite surface of the barrier member CP in the third direction DR3 (hereinafter referred to as the lower surface). The panel support SS may be a rigid member that does not easily change shape or volume due to external pressure.

The panel support SS may include a grid pattern overlapping the folding area FDA in a plan view so that it is bent easily in the folding area FDA.

The protective member TPU may be disposed on the opposite surface of the panel support SS in the third direction DR3 (hereinafter referred to as lower surface). Specifically, the protective member TPU may be disposed on the lower surface of the panel support SS where it overlaps with the folding area FDA in the third direction DR3. The protective member TPU may be made of a material with elasticity so that its length can be varied according to folding and unfolding operations of the display device 10.

The protective member TPU may include a polymer material having hyper elastic properties. In an embodiment, for example, the protective member TPU may be a thermoplastic polyurethane ("TPU") having elasticity. The protective member TPU may have a thickness of about 1 to about 20 μm.

In some embodiments, the protective member TPU may have a small modulus so that it can be folded and unfolded along with the display device 10. For example, the protective member TPU may be made of a material having a modulus of less than 1 gigapascal (Gpa).

The protective member TPU can prevent particles from being introduced into the panel support SS from the outside.

The second adhesive member AD2 may be disposed on the lower surface of the panel support SS. Specifically, the second adhesive member AD2 may be disposed on the lower surface of the panel support SS except where the protective member TPU is disposed. The second adhesive member AD2 may be used to fill the space between the digitizer DZ and the metal support MP to increase the area where the digitizer DZ and the metal support MP are attached together, and may physically fix the digitizer DZ to the metal support MP.

The second adhesive member AD2 may include a pressure sensitive adhesive. If the adhesive member includes a pressure-sensitive adhesive, when pressure is applied to the adhesive member, the adhesive force of the adhesive member to the panel support SS and/or the digitizer DZ can increase. For example, after disposing the second adhesive member AD2 including the pressure-sensitive adhesive between the panel support SS and the digitizer DZ to apply pressure on it, the panel support SS and the digitizer DZ can be attached together by the adhesive member.

The pressure-sensitive adhesive included in the second adhesive member AD2 may include a natural rubber adhesive; a styrene/butadiene latex adhesive; an ABA block copolymer type thermoplastic rubber (where A is a thermoplastic polystyrene end-block, and B is a rubber mid-block of polyisoprene rubber, polybutadiene rubber, polyethylene rubber or polybutylene rubber); an acrylic polymer adhesive such as butyl rubber, polyisobutylene, polyacrylate, and vinyl acetate/acrylic ester copolymer; and a vinyl ether-based polymer adhesives such as polyvinyl methyl ether, polyvinyl ethyl ether, and polyvinyl isobutyl ether The thickness of the second adhesive member AD2 may be about 15 μm or less. For example, the thickness of the second adhesive member AD2 may be, but is not limited to, about 10 μm.

The digitizer DZ may include a first digitizer member DZ_1 and a second digitizer member DZ_2. The first digitizer member DZ_1 and the second digitizer member DZ_2 may be disposed on the lower surface of the panel support SS. The first digitizer member DZ_1 and the second digitizer member DZ_2 may be attached to the lower surface of the panel support SS by the second adhesive member AD2 as described above.

The first digitizer member DZ_1 and the second digitizer member DZ_2 may not be disposed in the folding area FDA to reduce folding stress of the display device 10. The first digitizer member DZ_1 may overlap the first non-folding area NFA1, and the second digitizer member DZ_2 may overlap the second flat portion PP1 in a plan view. A gap between the first digitizer member DZ_1 and the second digitizer member DZ_2 may overlap the folding area FDA and may be smaller than the width of the folding area FDA in the second direction DR2.

The first digitizer member DZ_1 and the second digitizer member DZ_2 may include electrode patterns for sensing proximity or contact of an electronic pen such as a stylus pen supporting an electromagnetic induction technology. The first digitizer member DZ_1 and the second digitizer member DZ_2 may sense a magnetic field or an electromagnetic signal emitted from the electronic pen based on the electrode patterns, and may determine touch coordinates of the point where the detected magnetic field or electromagnetic signal is largest.

Magnetic metal powder may be disposed on the bottom surface of the first digitizer member DZ_1 and the bottom surface of the second digitizer member DZ_2. This allows a magnetic field or electromagnetic signal having passed through the first digitizer member DZ_1 and the second digitizer member DZ_2 to flow into the magnetic metal powder. By doing so, it is possible to reduce the emission of the magnetic field or electromagnetic signal of the first digitizer member DZ_1 and the second digitizer member DZ_2 to the lower surface of the display device 10 by virtue of the magnetic metal powder.

The third adhesive member AD3 may be disposed on the bottom surface of the digitizer DZ. Specifically, the third adhesive member AD3 may be disposed on the lower surface of the first digitizer member DZ_1 and the second digitizer member DZ_2 to cover the lower surface of the first digitizer member DZ_1 and the lower surface of the second digitizer member DZ_2. The third adhesive member AD3 may be used to fill the space between the digitizer DZ and the metal support MP to increase the bonding area between the digitizer DZ and the metal support MP, and may physically fix the digitizer DZ to the metal support MP.

The third adhesive member AD3 may be made of substantially the same material as the above-described second adhesive member AD2. Therefore, the redundant description will be omitted.

The thickness of the third adhesive member AD3 may be about 15 μm or less. For example, the thickness of the second adhesive member AD2 may be, but is not limited to, about 13 μm.

The metal support MP may support the digitizer DZ. The metal support MP may include a first metal support member MP_1 and a second metal support member MP_2. The first metal support member MP_1 may be disposed on the opposite surface of the first digitizer member DZ_1 in the third direction DR3 (hereinafter referred to as lower surface), and the second metal support member MP_2 may be disposed on the opposite surface of the second digitizer member DZ_2 in the third direction DR3 (hereinafter, referred to as lower surface).

The first metal support member MP_1 and the second metal support member MP_2 may not overlap with the folding area FDA to reduce folding stress of the display device 10. In other words, the first metal support member MP_1 may overlap with the first non-folding area NFA1, and the second metal support member MP_2 may overlap with the second flat portion PP1. A gap between the first metal support member MP_1 and the second metal support member MP_2 may overlap with the folding area FDA and may be smaller than the width of the folding area FDA in the second direction DR2.

The first metal support member MP_1 and the second metal support member MP_2 may include a material having high rigidity. For example, the first metal support member MP_1 and the second metal support member MP_2 may include stainless steel such as SUS316.

The cushion member CS may include a first cushion member CS_1 and a second cushion member CS_2. The first cushion member CS_1 and the second cushion member CS_2 absorb an external shock to prevent the panel support SS and the digitizer members from being damaged. The first cushion member CS_1 and the second cushion member CS_2 may include a material having elasticity, such as rubber, a urethane-based material, and a sponge formed by foaming an acrylic material.

The first cushion member CS_1 may be disposed on the lower surface of the first metal support member MP_1, and the second cushion member CS_2 may be disposed on the lower surface of the second metal support member MP_2. The first cushion member CS_1 and the second cushion member CS_2 may not be disposed in the folding area FDA to reduce folding stress of the display device 10. The first cushion member CS_1 may be disposed in the first non-folding area NFA1, and the second cushion member CS_2 may be disposed in the second flat portion PPT. A gap between the first cushion member CS_1 and the second cushion member CS_2 may overlap with the folding area FDA in a plan view and may be smaller than the width of the folding area FDA in the second direction DR2.

The fourth adhesive member AD4 can prevent moisture or particles from permeating into the display device 10. The fourth adhesive member AD4 may be disposed on the opposite surface of the first metal support member MP_1 in the third direction DR3 (hereinafter referred to as lower surface), and on the opposite surface of the second metal support member MP_2 in the third direction DR3 (hereinafter referred to as lower surface). The fourth adhesive member AD4 may be disposed on an edge of the first metal support member MP_1 and an edge of the second metal support member MP_2. The fourth adhesive member AD4 may be disposed to surround the first cushion member CS_1 and the second cushion member CS_2. The fourth adhesive member AD4 may include a waterproof tape or a waterproof member (not shown) for attaching an upper surface of a frame disposed on the lower surface of the first metal support member MP_1 and the lower surface of the cushion member CS.

The fourth adhesive member AD4 may not surround the first cushion member CS_1 and the second cushion member CS_2 and may overlap a magnet for holding the second state of the display device 10 in the third direction DR3. In this instance, the fourth adhesive member AD4 may work as a magnetic shield capable of shielding the digitizer members or the display panel PNL from being affected by the magnetism of the magnet.

A function hole CH may penetrate the cushion member CS, the metal support MP, the third adhesive member AD3, the digitizer DZ, the second adhesive member AD2, the panel support SS, and the barrier member CP. More specifically, the function hole CH may include a cushion member hole CH7, a metal support hole CH6, a third adhesive member hole CH5, a digitizer hole CH4, a second adhesive member hole CH3, a panel support hole CH2, and a barrier member hole CH1. The cushion member CS may define the cushion member hole CH7 penetrating through the cushion member CS, the metal support MP may define the metal support hole CH6 penetrating through the metal support MP, the third adhesive member AD3 may define the third adhesive member hole CH5 penetrating through the third adhesive member, the digitizer DZ may define the digitizer hole CH4 penetrating through the digitizer DZ, the second adhesive member AD2 may define the second adhesive member hole CH3 penetrating through the second adhesive member AD2, the panel support SS may define the panel support hole penetrating through the panel support SS, and the barrier member CP may define the barrier member hole penetrating through the barrier member CP. All of the cushion member hole CH7, the metal support hole CH6, the third adhesive member hole CH5, the second adhesive member hole CH3, the panel support hole CH2 and the barrier member hole CH1 may be in line with the digitizer hole CH4 in the third direction DR3. Accordingly, the cushion member CS, the metal support MP, the third adhesive member AD3, the digitizer DZ, the second adhesive member AD2, the panel support SS and the barrier member CP may have a shape sharing the same hole. In addition, the digitizer hole CH4 may overlap with the transmissive display area DA_T described above with reference to FIGS. 1 and 3.

A camera may be disposed in the function hole CH, but the present disclosure is not limited thereto. In another embodiment, for example, various sensors such as an infrared sensor and a motion sensor may be disposed in the function hole CH.

Figure 7:
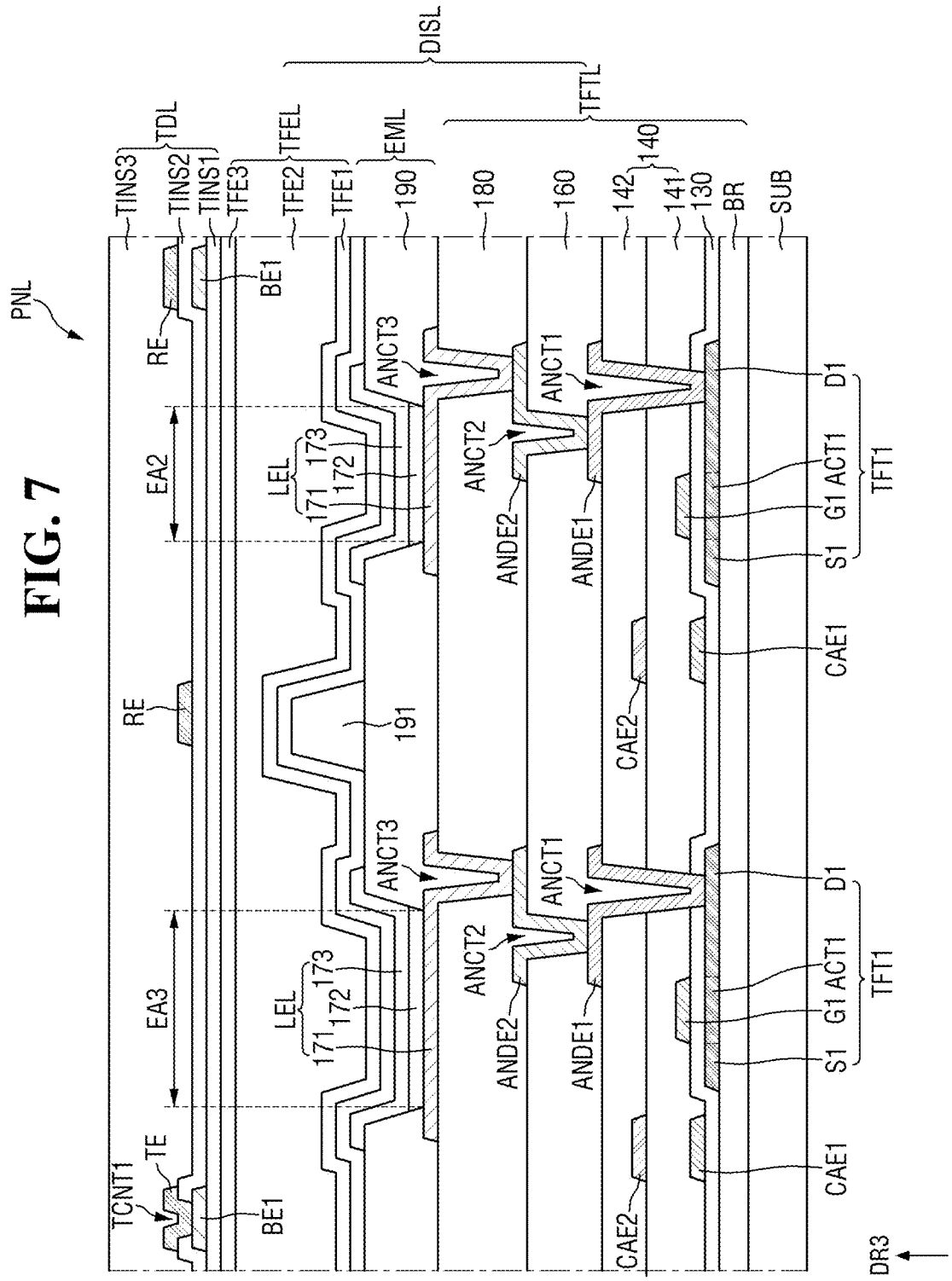
FIG. 7 is a cross-sectional view showing an example of the display panel of FIG. 6 in detail.

FIG. 7 is a cross-sectional view showing an example of the display panel of FIG. 6 in detail.

Referring to FIG. 7, a display layer DISL may be disposed on the substrate SUB. The display layer DISL may include a thin-film transistor layer TFTL, an emission material layer EML, and an encapsulation layer TFEL.

The thin-film transistor layer TFTL may be disposed on the substrate SUB. The thin-film transistor layer TFTL may include a barrier layer BR, a thin-film transistor TFT1, a first capacitor electrode CAE1, a second capacitor electrode CAE2, a first anode connection electrode ANDE1, a second anode connection electrode ANDE2, a gate insulator 130, a first interlayer dielectric film 141, a second interlayer dielectric film 142, a first planarization film 160, a second planarization film 180.

The substrate SUB may be made of an insulating material such as a polymer resin. For example, the substrate SUB may be made of polyimide. The substrate SUB may be a flexible substrate that can be bent, folded, or rolled.

The barrier film BR may be disposed on the substrate SUB. The barrier film BR is a film for protecting the thin-film transistors of the thin-film transistor layer TFTL and an emissive layer 172 of the emission material layer EML. The barrier film BR may be formed of multiple inorganic films stacked on one another alternately. For example, the barrier film BR may be made up of multiple layers in which one or more inorganic layers of a silicon nitride layer, a silicon oxynitride layer, a silicon oxide layer, a titanium oxide layer and an aluminum oxide layer are alternately stacked on one another.

The thin-film transistors TFT1 may be disposed on the barrier film BR. An active layer ACT1 of the thin-film transistor TFT1 may be disposed on the barrier layer BR. The active layer ACT1 of the thin-film transistor TFT1 may include polycrystalline silicon, monocrystalline silicon, low-temperature polycrystalline silicon, amorphous silicon, or an oxide semiconductor.

The active layer ACT1 may include a channel region CHA1, a source region S1 and a drain region D1. The channel region CHA1 may overlap with a gate electrode G1 in the third direction DR3 that is the thickness direction of the substrate SUB. The source region S1 may be disposed on one side of the channel region CHA1, and the drain region D1 may be disposed on the opposite side of the channel region CHA1. The source region S1 and the drain region D1 may not overlap with the gate electrode G1 in the third direction DR3. The source region S1 and the drain region D1 may be formed by doping a silicon semiconductor or an oxide semiconductor with ions or impurities to have conductivity.

The gate insulator 130 may be disposed on the active layer ACT1 of the thin-film transistor TFT1. The gate insulator 130 may be formed of an inorganic layer, for example, a silicon nitride layer, a silicon oxynitride layer, a silicon oxide layer, a titanium oxide layer, or an aluminum oxide layer.

The gate electrode G1 and the first capacitor electrode CAE1 of the thin-film transistor TFT1 may be disposed on the gate insulator 130. The gate electrode G1 may overlap with the active layer ACT1 in the third direction DR3. Although the gate electrode G1 and the first capacitor electrode CAE1 are spaced apart from each other in the example shown in FIG. 7, the gate electrode G1 and the first capacitor electrode CAE1 may be connected with each other as a single piece. The gate electrode G1 and the first capacitor electrode CAE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The first interlayer dielectric film 141 may be disposed on the gate electrode G1 of the thin-film transistor TFT1 and the first capacitor electrode CAE1. The first interlayer dielectric film 141 may be formed of an inorganic layer, for example, a silicon nitride layer, a silicon oxynitride layer, a silicon oxide layer, a titanium oxide layer, or an aluminum oxide layer. The first interlayer dielectric film 141 may be made of a plurality of inorganic films.

The second capacitor electrode CAE2 may be disposed on the first interlayer dielectric layer 141. The second capacitor electrode CAE2 may overlap the first capacitor electrode CAE1 of the thin-film transistor TFT1 in the third direction DR3. In addition, when the gate electrode G1 and the first capacitor electrode CAE1 are formed as a single piece, the second capacitor electrode CAE2 may overlap the gate electrode G1 in the third direction DR3. Since the first interlayer dielectric layer 141 has a predetermined dielectric constant, a capacitor can be formed by the first capacitor electrode CAE1, the second capacitor electrode CAE2 and the first interlayer dielectric layer 141 disposed therebetween. The second capacitor electrode CAE2 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second interlayer dielectric layer 142 may be disposed over the second capacitor electrode CAE2. The second interlayer dielectric layer 142 may be formed of an inorganic layer, for example, a silicon nitride layer, a silicon oxynitride layer, a silicon oxide layer, a titanium oxide layer, or an aluminum oxide layer. The second interlayer dielectric film 142 may be made of a plurality of inorganic films.

A first anode connection electrode ANDE1 may be disposed on the second interlayer dielectric layer 142. The first anode connection electrode ANDE1 may be connected to the drain electrode D1 of the thin-film transistor TFT1 through a first connection contact hole ANCT1 that penetrates the gate insulator 130, the first interlayer dielectric film 141 and the second interlayer dielectric film 142. The first anode connection electrode ANDE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first planarization film 160 may be disposed over the first anode connection electrode ANDE1 for providing a flat surface over level differences due to the thin-film transistor TFT1. The first planarization layer 160 may be formed of an organic layer such as an acryl resin, an epoxy resin, a phenolic resin, a polyamide resin and a polyimide resin.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second planarization layer 180 may be disposed on the second anode connection electrode ANDE2. The second planarization layer 180 may be formed as an organic layer such as an acryl resin, an epoxy resin, a phenolic resin, a polyamide resin and a polyimide resin.

An emission material layer EML including light-emitting elements LEL and a bank 190 may be disposed on the second planarization film 180. Each of the light-emitting elements LEL includes a pixel electrode 171, an emissive layer 172, and a common electrode 173.

The pixel electrode 171 may be disposed on the second planarization layer 180. The pixel electrode 171 may be connected to the second anode connection electrode ANDE2 through a third connection contact hole ANCT3 penetrating the second planarization layer 180.

In the top-emission structure in which light exits from the emissive layer 172 toward the common electrode 173, the pixel electrode 171 may be made of a metal material having a high reflectivity such as a stack structure of aluminum and titanium (Ti/Al/Ti), a stack structure of aluminum (Al) and Indium Tin Oxide ("ITO") (ITO/Al/ITO), an APC alloy and a stack structure of an APC alloy and ITO (ITO/APC/ITO). The APC alloy is an alloy of silver (Ag), palladium (Pd) and copper (Cu).

In order to define the first emission area EA1, the second emission area EA2, the third emission area EA3 and the fourth emission area EA4 in FIG. 5, the bank 190 may be formed to partition the pixel electrode 171 on the second planarization film 180. The bank 190 may be disposed to cover the edges of the pixel electrodes 171. The bank 190 may be formed of an organic layer such as an acryl resin, an epoxy resin, a phenolic resin, a polyamide resin and a polyimide resin.

In each of the first emission area EA1, the second emission area EA2, the third emission area EA3 and the fourth emission area EA4, the pixel electrode 171, the emissive layer 172 and the common electrode 173 are stacked on one another sequentially, so that holes from the pixel electrode 171 and electrons from the common electrode 173 are recombined in the emissive layer 172 to emit light.

The emissive layer 172 may be disposed on the pixel electrode 171 and the bank 190. The emissive layer 172 may include an organic material to emit light of a certain color. For example, the emissive layer 172 may include a hole transporting layer, an organic material layer, and an electron transporting layer.

The common electrode 173 may be disposed on the emissive layer 172. The common electrode 173 may be disposed to cover the emissive layer 172. The common electrode 173 may be a common layer formed commonly in the first emission area EA1, the second emission area EA2, the third emission area EA3 and the fourth emission area EA4. A capping layer may be formed on the common electrode 173.

In the top-emission organic light-emitting diode, the common electrode 173 may be formed of a transparent conductive material ("TCP") such as ITO and IZO that can transmit light, or a semi-transmissive conductive material such as magnesium (Mg), silver (Ag) and an alloy of magnesium (Mg) and silver (Ag). When the common electrode 173 is formed of a semi-transmissive metal material, the light extraction efficiency can be increased by using microcavities.

A spacer 191 may be disposed on the bank 190. The spacer 191 may support a mask during a process of fabricating the emission layer 172. The spacer 191 may be formed of an organic layer such as an acryl resin, an epoxy resin, a phenolic resin, a polyamide resin and a polyimide resin.

An encapsulation layer TFEL may be disposed on the common electrode 173. The encapsulation layer TFEL includes at least one inorganic film to prevent permeation of oxygen or moisture into the emission material layer EML. In addition, the encapsulation layer TFEL includes at least one organic layer to protect the light-emitting element layer EML from foreign substances such as dust. For example, the encapsulation layer TFEL includes a first inorganic encapsulation film TFE1, an organic encapsulation film TFE2 and a second inorganic encapsulation layer TFE3.

The first inorganic encapsulation film TFE1 may be disposed on the common electrode 173, the organic encapsulation film TFE2 may be disposed on the first inorganic encapsulation film TFE1, and the second inorganic encapsulation film TFE3 may be disposed on the organic encapsulation film TFE2. The first inorganic encapsulation film TFE1 and the second inorganic encapsulation film TFE3 may be made up of multiple layers in which one or more inorganic layers of a silicon nitride layer, a silicon oxynitride layer, a silicon oxide layer, a titanium oxide layer and an aluminum oxide layer are alternately stacked on one another. The organic encapsulation film TFE2 may be an organic film such as an acryl resin, an epoxy resin, a phenolic resin, a polyamide resin, a polyimide resin, etc.

A touch detecting layer TDL may be disposed on the encapsulation layer TFEL. The touch detecting layer TDL includes a first touch insulating film TINS1, connection electrodes BE, a second touch insulating film TINS2, the driving electrodes TE, the sensing electrodes RE, and a third touch insulating film TINS3.

The first touch insulating film TINS1 may be disposed on the encapsulation layer TFEL. The first touch insulating layer TINS1 may be formed of an inorganic layer, for example, a silicon nitride layer, a silicon oxynitride layer, a silicon oxide layer, a titanium oxide layer, or an aluminum oxide layer.

The connection electrode BE may be disposed on the first touch insulating film TINS1. The connection electrode BE may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The second touch insulating film TINS2 is disposed over the connection electrodes BE. The second touch insulating layer TINS2 may be formed of an inorganic layer, for example, a silicon nitride layer, a silicon oxynitride layer, a silicon oxide layer, a titanium oxide layer, or an aluminum oxide layer. Alternatively, the second touch insulating layer TINS2 may be formed of an organic layer such as an acryl resin, an epoxy resin, a phenolic resin, a polyamide resin and a polyimide resin.

The driving electrodes TE and the sensing electrodes RE may be disposed on the second touch insulating film TINS2. In addition to the driving electrodes TE and the sensing electrodes RE, the dummy patterns DE, the first touch driving lines TL1, the second touch driving lines TL2 and the touch sensing lines RL shown in FIG. 4 may be disposed on the second touch insulating film TINS1. The driving electrodes TE and the sensing electrodes RE may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The driving electrodes TE and the sensing electrodes RE may overlap with the connection electrodes BE in the third direction DR3. The driving electrodes TE may be connected to the connection electrodes BE through touch contact holes TCNT1 penetrating through the first touch insulating film TINS1.

The third touch insulating film TINS3 is formed over the driving electrodes TE and the sensing electrodes RE. The third touch insulating layer TINS3 may provide a flat surface over the driving electrodes TE, the sensing electrodes RE and the connection electrodes BE which having different heights. The third touch insulating film TINS3 may be formed of an organic layer such as an acryl resin, an epoxy resin, a phenolic resin, a polyamide resin and a polyimide resin.

Figure 8:
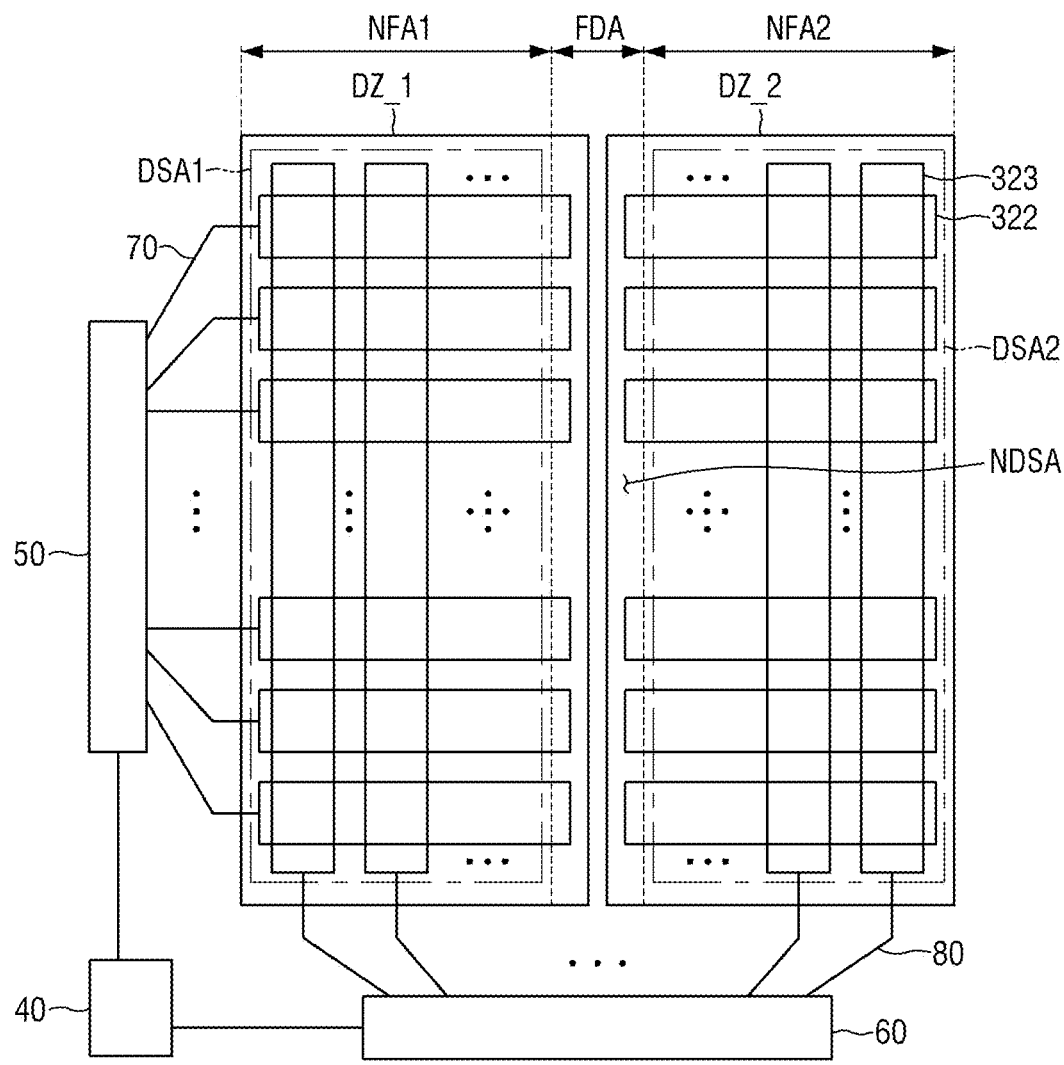
FIG. 8 is a block diagram for illustrating a method of driving the digitizer DZ.

FIG. 8 is a block diagram for illustrating a method of driving the digitizer DZ.

Referring to FIG. 8, the display device 10 may include a first signal processor 50, a second signal processor 60, and a controller 40 for driving the digitizer DZ. The digitizer DZ may include first conductive patterns 322 extended in one direction, and second conductive patterns 323 extended in a direction crossing the one direction in which the first conductive patterns 322 are extended.

The first signal processor 50 may apply an electromagnetic signal to each of the first conductive patterns 322 or may receive an electromagnetic signal absorbed by each of the first conductive patterns 322. The second signal processor 60 may apply an electromagnetic signal to each of the second conductive patterns 323 or may receive an electromagnetic signal absorbed by each of the second conductive patterns 323. The controller 40 may control the overall driving of the digitizer DZ, and may output proximity or contact information of an electronic pen through the electromagnetic signals transmitted from the first signal processor 50 and the second signal processor 60. Although the first digitizer member DZ_1 and the second digitizer member DZ_2 are spaced apart from each other, and the first conductive patterns 322 disposed on the first digitizer member DZ_1 and the first conductive patterns 322 disposed on the second digitizer member DZ_2 are not connected with each other in the example shown in FIG. 8 for convenience of illustration, the present disclosure is not limited thereto. In another embodiment, for example, the first digitizer member DZ_1 and the second digitizer member DZ_2 may not be spaced apart from each other, and the first conductive patterns 322 disposed on the first digitizer member DZ_1 and the first conductive patterns 322 disposed on the second digitizer member DZ_2 may be connected with each other.

In addition, although each of the first signal processor 50, the second signal processor 60 and the controller 40 is illustrated as a separate block in the example shown in FIG. 8 for convenience of illustration, the present disclosure is not limited thereto. In another embodiment, they may be implemented as a single module, unit or chip.

The first conductive patterns 322 and the second conductive patterns 323 may intersect each other when viewed from the top (i.e., in a view in a thickness direction). The magnetic field or electromagnetic signal emitted from an electronic pen may be absorbed by the first conductive patterns 322 and the second conductive patterns 323. The electromagnetic signal absorbed by the first conductive patterns 322 may be transmitted to the controller 40 through the first signal processor 50, and the electromagnetic signal absorbed by the second conductive patterns 323 may be transmitted to the controller 40 through the second signal processor 60. The controller 40 may determine which position of the digitizer DZ the electronic pen is proximate based on coordinates from the above-described intersection structure.

In some embodiments, at least some of the first electrode patterns 322 and the second electrode patterns 323 may generate magnetic field in response to an input current input from the first signal processor 50 and/or the second signal processor 60, and the generated magnetic field may be absorbed by the electronic pen. The electronic pen may emit again the absorbed magnetic field, and the magnetic field emitted by the electronic pen may be absorbed by the first conductive patterns 322 and the second conductive patterns 323. In this manner, the controller 40 can determine which position of the digitizer DZ the electronic pen is proximate based on coordinates as described above.

In the example shown in FIG. 8, the first conductive patterns 322 and the first signal processor 50 are electrically connected by first connection lines disposed on one side of the display device 10. However, the first conductive patterns 322 and the first signal processor 50 may be electrically connected by first connection lines 70 that are sequentially and alternately arranged on both sides. According to this configuration, it is advantageous to reduce the bezel width of both sides of the display device 10 by reducing the number of first connection lines 70 disposed on both sides of the display device 1.

In addition, although that the second conductive patterns 323 and the second signal processor 60 are electrically connected by second connection lines 80 disposed on one side of the display device 10 in the example shown in FIG. 5, the present disclosure is not limited thereto.

The display device 10 and the digitizer DZ may be divided into digitizer sensing areas DSA1 and DSA2, and anon-digitizer sensing area NDSA. The digitizer sensing areas DSA1 and DSA2 may include the above-described intersection structure formed by the first conductive patterns 322 and the second conductive patterns 323. As each of the first conductive patterns 322 of the digitizer DZ is formed to have a smaller thickness in the non-digitizer sensing area NDSA, proximity or contact by an electronic pen may not be sensed therein and an electrical signal may be transmitted. In the non-digitizer sensing area NDSA, the second conductive patterns 323 may not be disposed.

Herein, the non-digitizer sensing area NDSA does not sense proximity or contact of an electronic pen, but a user may feel as if the electronic pen is sensed. Specifically, although the contact or proximity of the electronic pen is not actually sensed in the non-digitizer sensing area NDSA, a user may feel as if the electronic pen comes in contact or is proximate and is sensed by using software compensation. Although the contact or proximity of the electronic pen is not accurately sensed in the non-digitizer sensing area NDSA because it is sensed in only one of the intersecting directions, a user may feel as if the electronic pen is sensed based on calculated coordinates by using software compensation.

Each of the digitizer sensing areas DSA1 and DSA2 and the non-digitizer sensing area NDSA may be extended regardless of the boundary between the display area DA and the non-display area NDA. Likewise, each of the digitizer sensing areas DSA1 and DSA2 and the non-digitizer sensing area NDSA may be extended regardless of the boundary between the touch sensing area TSA and the non-touch sensing area NTSA.

As a non-limiting example, the first digitizer sensing area DSA1 may overlap with the display area DA and the touch sensing area TSA of the first non-folding area NFA1, the second digitizer sensing area DSA2 may overlap with the display area DA and the touch sensing area TSA of the second non-folding area NFA2, and the non-digitizer sensing area NDSA may overlap with the display area DA and the touch sensing area TSA of the folding area FDA in a plan view.

The first digitizer sensing area DSA1 may overlap with the first non-folding area NFA1, the second digitizer sensing area DSA2 may overlap with the second non-folding area NFA2, and the non-digitizer sensing area NDSA may overlap with the folding area FDA in a plan view. The width of the non-digitizer sensing area NDSA in the first direction DR1 may be substantially equal to the width of the folding area FDA in the first direction DR1. The distance between the first digitizer sensing area DSA1 and the second digitizer sensing area DSA2 in the first direction DR1 may be substantially equal to the width of the folding area FDA in the first direction DR1. According to another embodiment, the width of the non-digitizer sensing area NDSA in the first direction DR1 may be smaller than the width of the folding area FDA in the first direction DR1. Accordingly, the distance between the first digitizer sensing area DSA1 and the second digitizer sensing area DSA2 in the first direction DR1 may be smaller than the width of the folding area FDA in the first direction DR1. The first digitizer sensing area DSA1 and the second digitizer sensing area DSA2 may overlap at least partially with the folding area FDA in a plan view.

Figure 9:
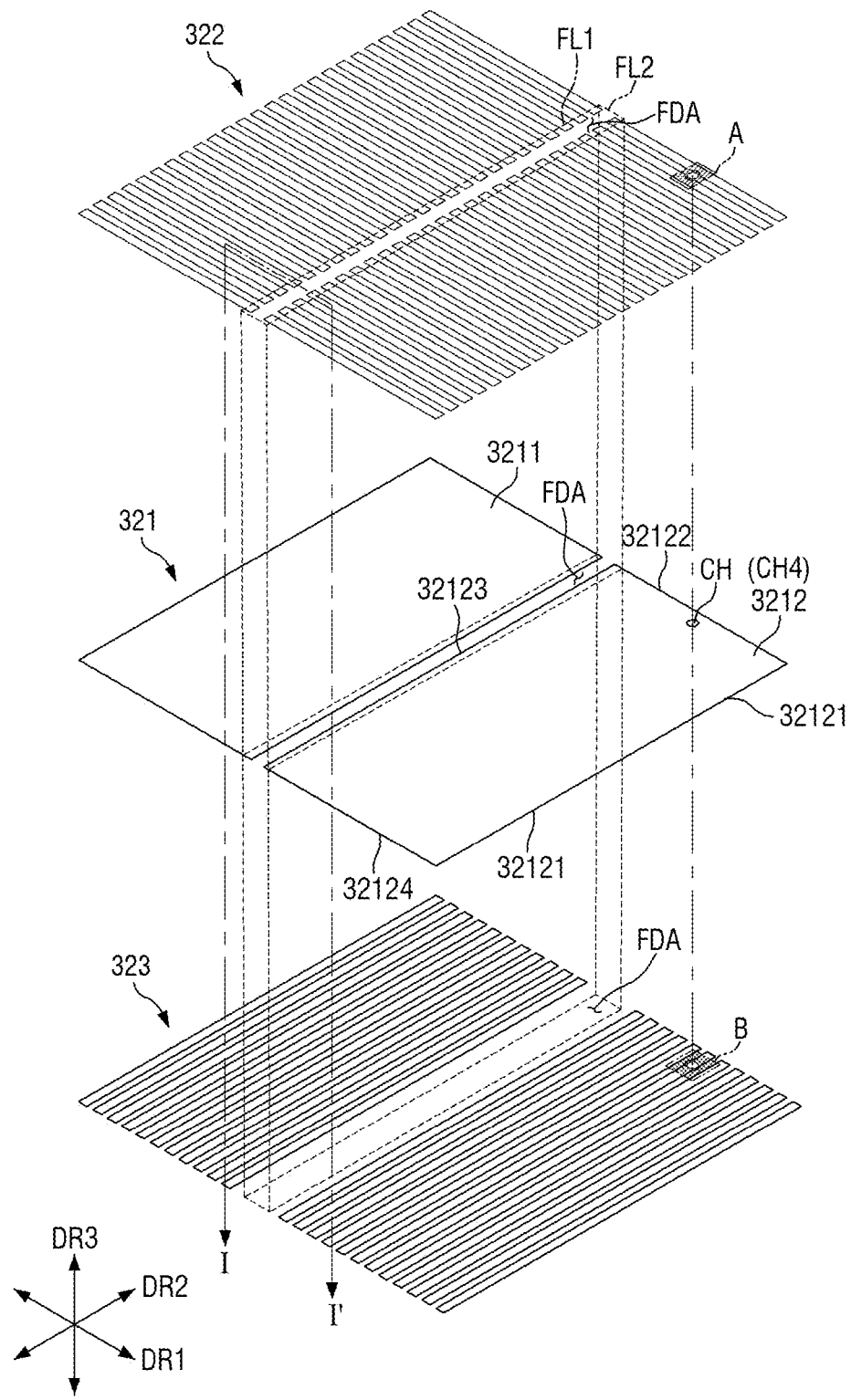
FIG. 9 is an exploded perspective view of the digitizer of FIG. 6.
Figure 10:
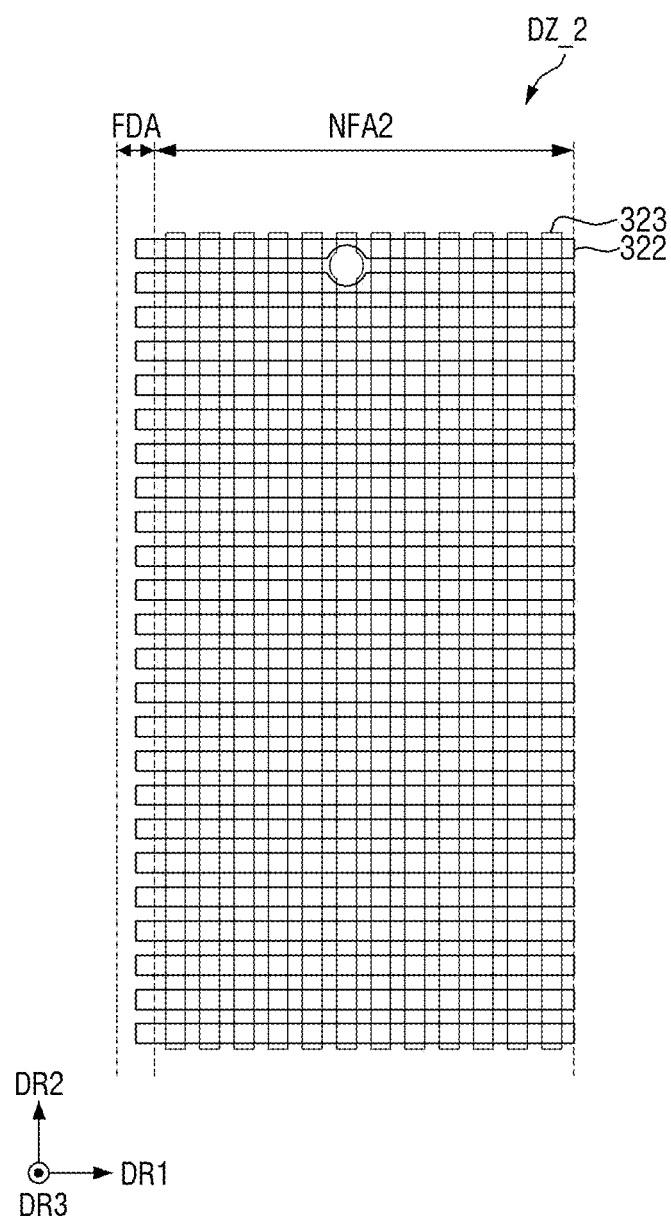
FIG. 10 is a plan view showing the layout of the second digitizer member when viewed from the top.

FIG. 9 is an exploded perspective view of the digitizer DZ of FIG. 6. FIG. 10 is a plan view showing the layout of the second digitizer member DZ_2 when viewed from the top (i.e., in a plan view).

Referring to FIGS. 9 and 10, the digitizer DZ may further include a base layer 321 disposed between the first conductive patterns 322 and the second conductive patterns 323, a first adhesive layer (not shown) disposed on the upper surface of the first conductive patterns 322, a first cover layer disposed on the upper surface of the first adhesive layer, a second adhesive layer disposed on the lower surface of the second conductive patterns, and a second cover layer disposed on the lower surface of the second adhesive layer.

The base layer 321 may serve as a substrate on which the first conductive patterns 322 and the second conductive patterns 323 are disposed. The base layer 321 may include an insulating material to electrically separate the first conductive patterns 322 from the second conductive patterns 323. In an embodiment, for example, the base layer 321 may include, but is not limited to, polyimide.

The base layer 321 may include a first base layer 3211 and a second base layer 3212. Although the first base layer 3211 and the second base layer 3212 are spaced apart from each other in the drawings, the present disclosure is not limited thereto. In another embodiment, for example, the first base layer 3211 and the second base layer 3212 may be connected with each other as a single piece. The first base layer 3211 and the second base layer 3212 may be different from each other in that one of them includes the function hole CH whereas the other does not. The first base layer 3211 may include no function hole CH, whereas the second base layer 3212 may include the function hole CH.

The side of the second base layer 3212 in the first direction DR1 is defined as a first side 32121, and the sides are defined as a second side 32122, a third side 32123 and a fourth side 32124, respectively, in the counterclockwise direction from the first side 32121.

The base layer 321 may define the function hole CH therein. Specifically, the base layer 321 may include a digitizer hole CH4 penetrating through the base layer 321. The digitizer hole CH4 may be located adjacent to the second side 32122 in the second base layer 3212. Specifically, the shortest distance from the digitizer hole CH4 to the second side 32122 may be shorter than each of the shortest distances from the digitizer hole CH4 to the first side 32121, the third side 32123 and the fourth side 32124.

The first conductive patterns 322 may be disposed on the upper surface of the base layer 321. Each of the first conductive patterns 322 may be extended in the first direction DR1. The first conductive patterns 322 may be arranged in the second direction DR2. Each of the first conductive patterns 322 may have a shape of a closed loop structure (e.g., a rectangle) when viewed from the top (i.e., view in the third direction DR3).

The second conductive patterns 323 may be disposed on the lower surface of the base layer 321. Each of the second conductive patterns 323 may be extended in the second direction DR2. The second conductive patterns 323 may be arranged in the first direction DR1. Each of the second conductive patterns 323 may have a shape of a closed loop structure (e.g., a rectangle) when viewed from the top (i.e., view in the thickness direction DR3).

Each of the first conductive patterns 322 and the second conductive patterns 323 may include a metal material such as copper (Cu), silver (Ag), nickel (Ni) and tungsten (W).

Although each of the first conductive patterns 322 and the second conductive patterns 323 has a rectangular, closed-loop structure when viewed from the top, embodiments of the present disclosure are not limited thereto. In another embodiment, each of the first conductive patterns 322 and the second conductive patterns 323 may have a variety of types of loop structures, including a diamond, a polygon such as a pentagon and a hexagon, a circle, an oval, etc. when viewed from the top.

As the first conductive patterns 322 are extended in the first direction DR1, which is perpendicular to the folding lines FL1 and FL2, they may be disposed across the folding area FDA and the non-folding areas which have different magnitudes of stress applied when the display device 10 is folded. It should be understood that the present disclosure is not limited thereto. In another embodiment, for example, the first conductive patterns 322 may be extended in a direction forming an acute or obtuse angle with the extension direction of the folding lines FL1 and FL2, and may be arranged across the first non-folding area NFA1, the folding area FDA and the second non-folding area NFA2.

Figure 11:
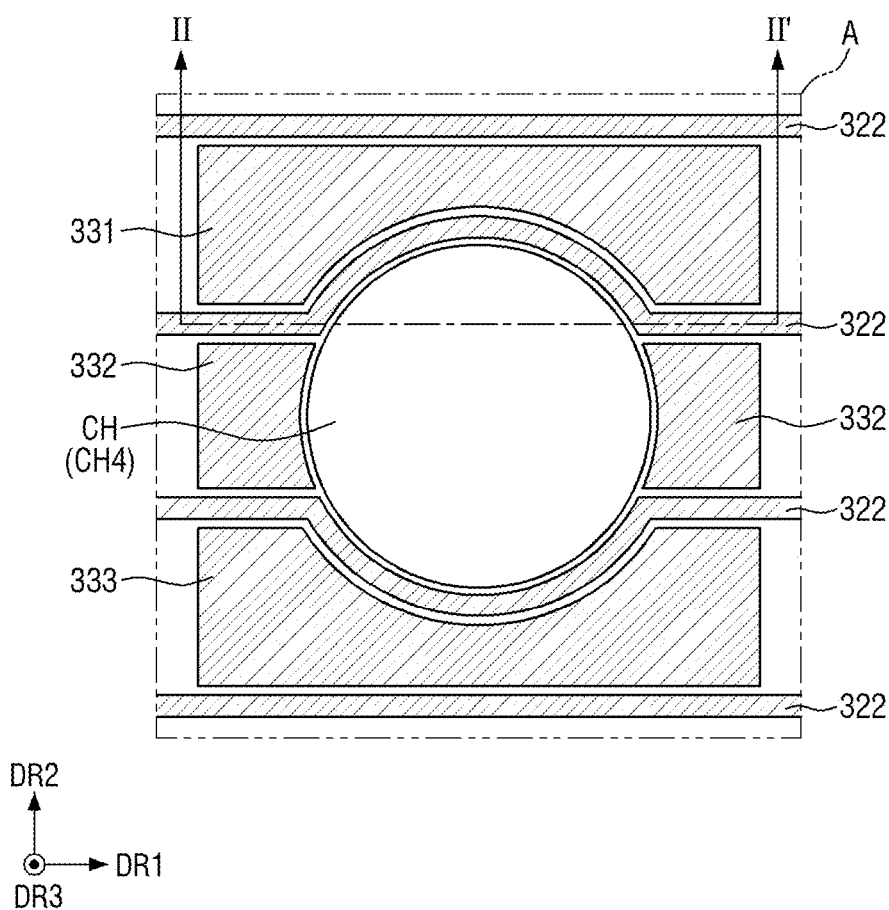
FIG. 11 is an enlarged view of portion A of FIG. 9.
Figure 12:
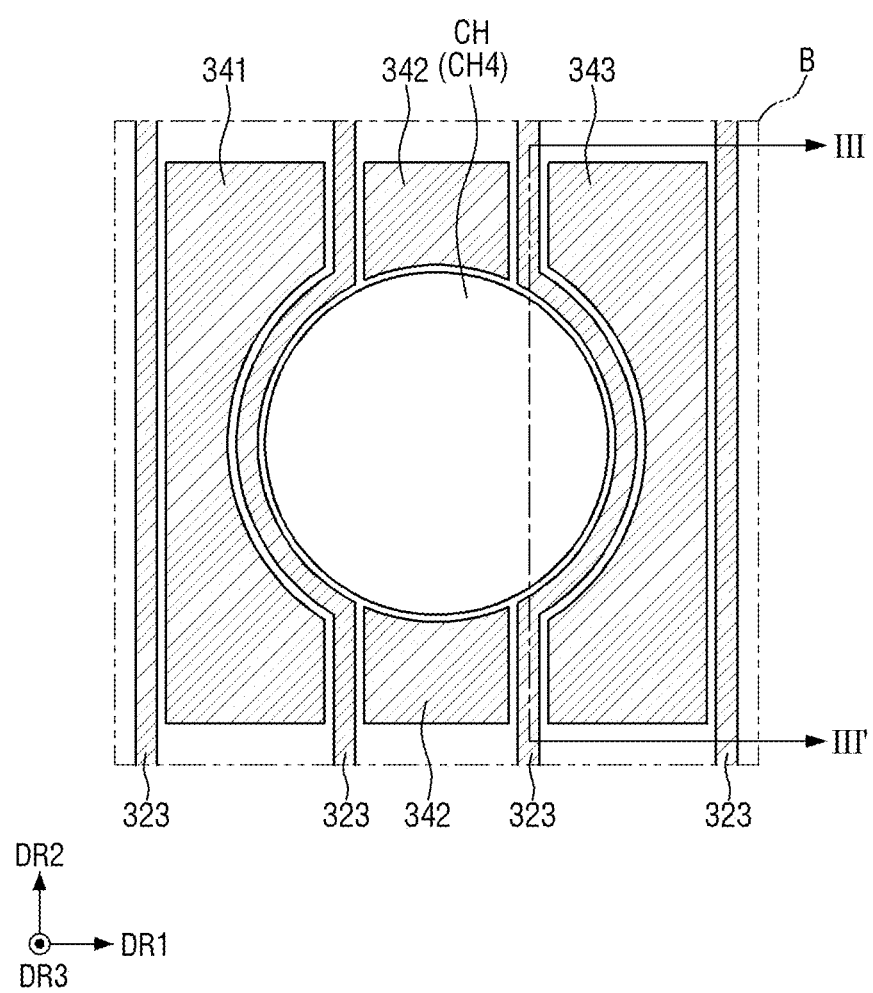
FIG. 12 is an enlarged view of area B of FIG. 9.

FIG. 11 is an enlarged view of portion A of FIG. 9. FIG. 12 is an enlarged view of area B of FIG. 9.

Referring to FIG. 11, the function hole CH is an area in which a hole is drilled so that the inside is empty, and the first conductive patterns may be arranged on the left and right sides. The first conductive patterns may be arranged in the left and right sides, and may be extended around the function hole CH. With such arrangement, the first conductive patterns may not overlap with the function hole CH in the third direction DR3.

A plurality of step-covering patterns 331, 332 and 333 may be disposed between the first conductive patterns 322 that are adjacent to and extended around the function hole CH in the base layer 321, and between the plurality of first conductive patterns 322 adjacent to them.

The first conductive patterns 322 may be spaced apart from one another. The step-covering patterns 331, 332 and 333 may be disposed between the first conductive patterns 322 spaced apart from one another. Each of the step-covering patterns 331, 332 and 333 may be disposed in the space formed by the respective adjacent first conductive patterns 322 such that it is spaced apart from the adjacent first conductive patterns 322. The first conductive patterns 322 and the first step-covering patterns 331, 332 and 333 may be sufficiently spaced apart from each other so that the current flowing in the first conductive patterns 322 does not flow to the step-covering patterns 331, 332 and 333. For example, the distance between the adjacent first conductive patterns 322 and the first step-covering patterns 331, 332 and 333 may be but is not limited to, about 1 μm to about 8 μm. As the first conductive patterns 322 and the first step-covering patterns 331, 332 and 333 are spaced apart from each other, the current flowing in the first conductive patterns 322 can flow inside the first conductive patterns 322 irrespectively of the step-covering patterns 331, 332, 333, 341, 342 and 343.

Some of the step-covering patterns 331, 332, 333, 341, 342 and 343 disposed on the upper surface of the base layer 321 are defined as first step-covering patterns 331, 332 and 333. When viewed from the top (i.e., in a plan view), among the step-covering patterns 331, 332, 333, 341, 342 and 343, the step-covering pattern disposed on the upper side of the function hole CH in the second direction DR2 is defined as a (1-1) step-covering pattern 331, the step-covering pattern disposed on the left and right sides of the function hole CH in the first direction DR1 is defined as a (1-2) step-covering pattern 332, and the step-covering pattern on the lower side of the function hole CH in the second direction DR2 is defined as a (1-3) step-covering pattern 333.

The (1-1) step-covering pattern 331 is disposed on the side adjacent to the outside of the foldable display 10 when viewed from the top. Accordingly, by disposing the (1-1) step-covering pattern 331 on the base layer 321, it is possible to reduce the level difference on the base layer 321 due to the first conductive patterns 322. In this manner, the level difference can be reduced, so that a sufficient adhesion strength between the top surface of the digitizer DZ and the second adhesive member AD2 can be ensured near the function hole CH. Therefore, it is possible to prevent permeation of outside moisture through a gap which may be created if the adhesion strength between the top surface of the digitizer DZ and the second adhesive member AD2 is not sufficient and thus the upper surface of the digitizer DZ and the second adhesive member AD2 are separated from each other.

The (1-2) step-covering pattern 332 is disposed on the left and right sides of the function hole CH. Accordingly, by disposing the (1-2) step-covering pattern 332 between the adjacent first and patterns 322 on the left and right sides of the function hole CH, it is possible to reduce the level difference on the base layer 321 created by the first conductive patterns 332. In this manner, the level difference can be reduced, so that a sufficient adhesion strength between the top surface of the digitizer DZ and the second adhesive member AD2 can be ensured near the function hole CH.

The (1-3) step-covering pattern 333 is disposed on the lower side of the function hole CH. Accordingly, by disposing the (1-2) step-covering pattern 332 between the adjacent first and patterns 322 on the left and right sides of the function hole CH, it is possible to reduce the level difference on the base layer 321 caused by the first conductive patterns 332. In this manner, the level difference can be reduced, so that a sufficient adhesion strength between the top surface of the digitizer DZ and the second adhesive member AD2 can be ensured near the function hole CH.

The side of each of the first step-covering patterns 331, 332 and 333 may include a portion having the same curvature as that of the function hole CH near the function hole CH. For example, each of the lower side of the (1-1) step-covering pattern 331, the left and right sides of the (1-2) step-covering pattern 332 and the upper side of the (1-3) step-covering pattern 333 may include a portion having the same curvature as the curvature of the function hole CH.

Although the step-covering patterns 331, 332, 333, 341, 342 and 343 are disposed only near the function hole CH in the example shown in the drawings, the present disclosure is not limited thereto. In another embodiment, for example, the step-covering patterns 331, 332, 333, 341, 342 and 343 may be disposed not only near the function hole CH but also in most of the areas between the first conductive patterns 322 on the top surface of the digitizer DZ, excluding the function hole CH such that they are spaced apart from the first conductive patterns 322.

The step-covering patterns 331, 332, 333, 341, 342 and 343 may be made of the same components as the first conductive patterns 322 and the second conductive patterns 323. For example, each of the step-covering patterns 331, 332, 333, 341, 342 and 343 may include a metal material such as copper (Cu), silver (Ag), nickel (Ni) and tungsten (W). The step-covering patterns 331, 332, 333, 341, 342 and 343 may be formed via the same process as the first conductive patterns 322 and the second conductive patterns 323. It should be understood, however, that the present disclosure is not limited thereto.

In some embodiments, the step-covering patterns 331, 332, 333, 341 342 and 343 may be made of an insulating material such as an organic material, unlike the first conductive patterns 322 and the second conductive patterns 323. In such case, the step-covering patterns 331, 332, 333, 341, 342 and 343 may be spaced apart from the first conductive patterns 322 and the second conductive patterns 323, or may be in direct contact with the first conductive patterns 322 and the second conductive patterns 323.

Referring to FIG. 12, the arrangements of the second conductive patterns 323 and the step-covering patterns 341, 342 and 343 on the bottom surface of the digitizer DZ are substantially identical to the arrangements of the first conductive patterns 322 described above with reference to FIG. 11 except that the second conductive patterns 323 are arranged in the second direction DR2. The step-covering patterns 341, 342 and 343 may be disposed on the lower surface of the digitizer size such that they are spaced apart from the second conductive patterns 323 near the function hole CH.

The others of the step-covering patterns 331, 332, 333, 341, 342 and 343 which are disposed on the lower surface of the base layer 321 are defined as second step-covering patterns 341, 342 and 343. In addition, when viewed from the top (i.e., in the third direction DR3), among the step-covering patterns 331, 332, 333, 341, 342 and 343, the step-covering pattern disposed on the left side of the function hole CH in the first direction DR1 is defined as a (2-1) step-covering pattern 341, the step-covering pattern disposed on the upper and lower sides of the function hole CH in the second direction DR2 is defined as a (2-2) step-covering pattern 332, and the step-covering pattern on the right side of the function hole CH in the first direction DR1 is defined as a (2-3) step-covering pattern 333.

The side of each of the second step-covering patterns 341, 342 and 343 may include a portion having the same curvature as that of the function hole CH near the function hole CH. For example, each of the right side of the (2-1) step-covering pattern 341, the upper and lower sides of the (1-2) step-covering pattern 332 and the left side of the (1-3) step-covering pattern 333 may include a portion having the same curvature as the curvature of the function hole CH.

Although the step-covering patterns 331, 332, 333, 341, 342 and 343 are disposed only near the function hole CH in the example shown in the drawings, the present disclosure is not limited thereto. In another embodiment, for example, the step-covering patterns 331, 332, 333, 341, 342 and 343 may be disposed not only near the function hole CH but also in most of the areas between the second conductive patterns 323 on the bottom surface of the digitizer DZ excluding the function hole CH such that they are spaced apart from the second conductive patterns 323.

By disposing the second step-covering patterns 341, 342 and 343, the level difference on the bottom surface of the digitizer DZ near the function hole CH is reduced, so that the adhesion strength between the digitizer DZ and the third adhesive member AD3 can be ensured.

The second step-covering patterns 341, 342 and 343 may be made of the same components as the first step-covering patterns 331, 332 and 333. Accordingly, the redundant description will be omitted.

Figure 13:
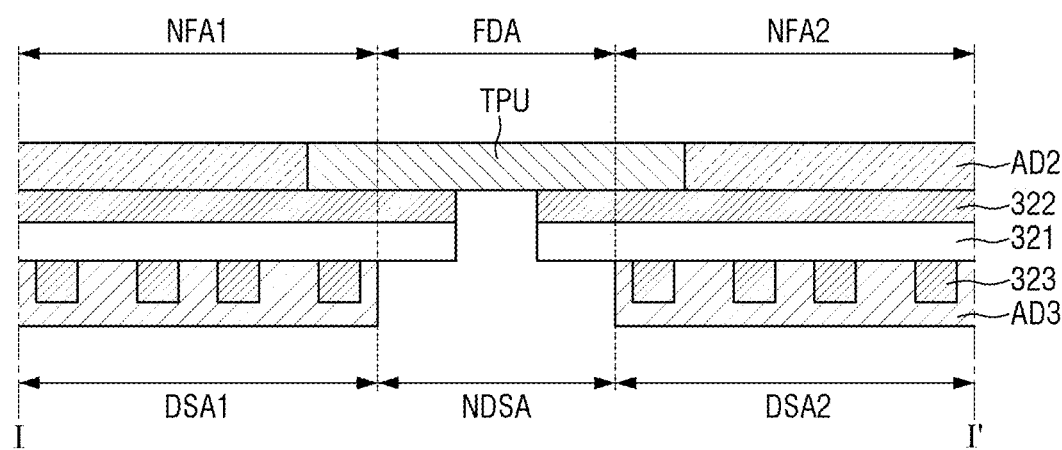
FIG. 13 is a cross-sectional view of the second adhesive member, the digitizer and the third adhesive member taken along line I-I' of FIG. 9.
Figure 13:
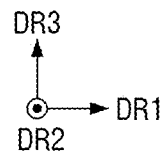

FIG. 13 is a cross-sectional view showing an example of the digitizer DZ, taken along line I-I' of FIG. 9.

Referring to the cross-sectional view of FIG. 13, first conductive patterns 322 may be disposed on the upper surface of the base layer 321 while second conductive patterns 323 may be disposed on the lower surface of the base layer 321.

The first conductive patterns 322 may be in direct contact with the upper surface of the base layer 321, may entirely cover the upper surface of the base layer 321, and may have a uniform thickness. It should be understood, however, that the present disclosure is not limited thereto. In another embodiment, for example, in some embodiments, the thickness of the first conductive patterns 322 in the folding area FDA may be smaller than the thickness in the first non-folding area NFA1 and the second non-folding area NFA2, or the thickness in at least one of the first non-folding area NFA1, the second non-folding area NFA2 and the folding area FDA may be different from the thicknesses of the other areas.

Although the first conductive patterns 322 and the base layer 321 are spaced apart from each other in the folding area in the drawings, the present disclosure is not limited thereto. In another embodiment, each of the first conductive patterns 322 may be made up of a single layer. It should be understood that the present disclosure is not limited thereto. In another embodiment, each of the first conductive patterns 322 may be made up of multiple layers, or same regions may be made up of a single layer while the other regions may be made up of multiple layers depending on desired characteristics. For example, as will be described later with reference to FIG. 12, when the first conductive patterns 322 are formed by plating in order that the thickness in each of the first non-folding area NFA1 and the second non-folding area NFA2 is larger than the thickness in the folding area FDA, the first conductive patterns may have a single-layer structure in the folding area FDA while a multi-layer structure in the first non-folding area NFA1 and the second non-folding area NFA2.

A second adhesive member AD2 and a protective member TPU may be disposed on upper surfaces of the first conductive patterns 322. As described above, the protective member TPU may be disposed to cover parts of the upper surfaces of the first conductive patterns 322 that are in the folding area FDA, while the second adhesive member AD2 may be disposed on the other parts of the upper surfaces of the first conductive patterns 322 than the parts where the protective member TPU is disposed.

The second conductive patterns 323 may be disposed on the lower surface of the base layer 321. Although the second conductive patterns 323 are spaced apart from one another and have a shape of a plurality of quadrangles with the upper surfaces in direct contact with the base layer 321 in the example shown in the drawings, the present disclosure is not limited thereto. In another embodiment, for example, the cross-sections of the second conductive patterns 323 may have various shapes, such as a triangle and a pentagon. Each of the second conductive patterns 323 may be disposed in the first non-folding area NFA1 and the second non-folding area NFA2 and may be eliminated in the folding area FDA. According to this structure, the display device 10 may be smoothly folded and it may be advantageous to reduce folding stress applied to the first conductive patterns 322 disposed in the folding area FDA.

In addition, although the second conductive patterns 323 have the same thickness in the drawings, the present disclosure is not limited thereto. In another embodiment, the thickness of each of the first conductive patterns 322 and the second conductive patterns 323 may have, but is not limited to, a value in the range of about 6 to about 13.0 μm.

A third adhesive member AD3 may be disposed on the base layer 321. More specifically, the third adhesive member AD3 may be disposed on the lower surface of the base layer 321 to cover side surfaces and lower surfaces of the second conductive patterns 323. Accordingly, the space between the second conductive patterns 323 may be filled with the third adhesive member AD3.

Figure 14:
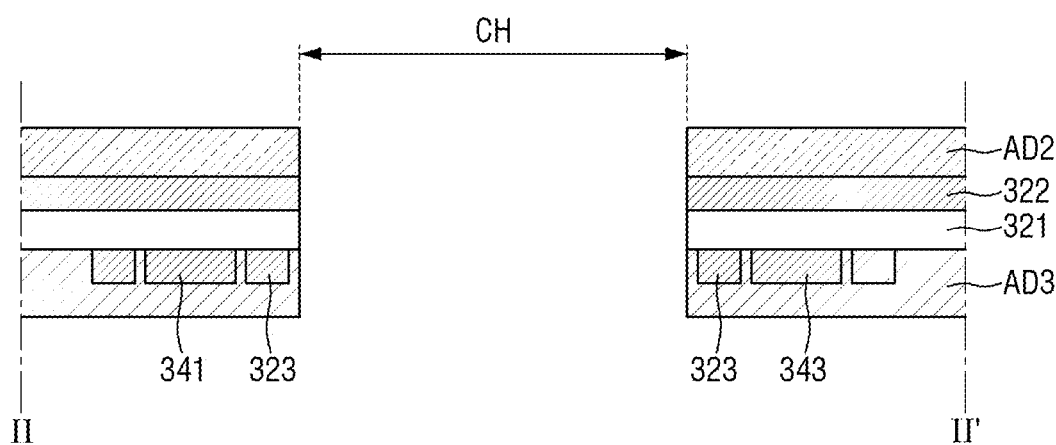
FIG. 14 is a cross-sectional view of the second adhesive member, the digitizer and the third adhesive member taken along line II-II' of FIG. 11.

FIG. 14 is a cross-sectional view of the second adhesive member AD2, the digitizer DZ and the third adhesive member AD3 taken along line II-II' of FIG. 10.

Referring to the cross-sectional view of FIG. 14, first conductive patterns 322 may be disposed on the upper surface of the base layer 321 while second conductive patterns 323 and second step-covering patterns 341, 342 and 343 may be disposed on the lower surface of the base layer 321.

The first conductive patterns 322 may be in direct contact with the upper surface of the base layer 321, may cover the upper surface of the base layer 321, and may have a uniform thickness. It should be understood, however, that the present disclosure is not limited thereto.

A second adhesive member AD2 may be disposed on upper surfaces of the first conductive patterns 322. In the cross-sectional view, the upper surfaces of the first conductive patterns 322 have a flat shape, and thus the first conductive patterns and the second adhesive member AD2 can have sufficient adhesion strength.

The second conductive patterns 323 and the second step-covering patterns 341, 342 and 343 may be disposed on the lower surface of the base layer 321. The second conductive patterns 323 and the second step-covering patterns 341, 342 and 343 may be spaced apart from each other. The distance between the adjacent second conductive patterns 323 and the second step-covering patterns 341, 342 and 343 may be equal to, but is not limited to, 1 about μm to about 8 μm.

Although the second conductive patterns 323 and the second step-covering patterns 341, 342 and 343 have a shape of a plurality of quadrangles with the upper surfaces in direct contact with the base layer 321 in the example shown in the drawings, the present disclosure is not limited thereto. In another embodiment, for example, the cross-sections of the second conductive patterns 323 may have various shapes, such as a triangle and a pentagon.

The lower surfaces of the second conductive patterns 323 and the second step-covering patterns 341, 342 and 343 may have a flat shape. Although the second conductive patterns 323 have the same thickness in the drawings, the present disclosure is not limited thereto. In another embodiment, the thickness of each of the first conductive patterns 322 and the second conductive patterns 323 may have, but is not limited to, a value in the range of about 6 to about 13.0 μm.

A third adhesive member AD3 may be disposed on the lower surface of the base layer 321. More specifically, the third adhesive member AD3 may be disposed on the lower surface of the base layer 321 to cover side surfaces and lower surfaces of the second conductive patterns 323 and the second step-covering patterns 341, 342 and 343. As described above, by disposing the second step-covering patterns 341, 342 and 343 between the second conductive patterns 323, it is possible to reduce the level difference on the base layer 321 near the function hole CH due to the second conductive patterns 323. Accordingly, it is possible to prevent the problem that the third adhesive member AD3 is separated from the digitizer DZ and thus outside moisture permeates, which may arise because it is difficult to obtain a sufficient space for attaching the third adhesive member AD3 near the function hole CH or because a sufficient adhesion strength is not obtained between the digitizer DZ and the third adhesive member AD3.

Although the second conductive patterns 323 and the second step-covering patterns 341, 342 and 343 are spaced apart from each other in the example shown in the drawings, the present disclosure is not limited thereto. In another embodiment, for example, when the second step-covering patterns 341, 342 and 343 are made of an insulating material, even if the second conductive patterns 323 and the second step-covering patterns 341, 342 and 343 are in direct contact with each other, the current of the second conductive patterns 323 does not flow to the second step-covering patterns 341, 342 and 343. Accordingly, the spaces between the second conductive patterns 323 may be completely filled with the second step-covering patterns 341, 342 and 343. In this instance, there may be no level difference on the base layer 321 near the function hole CH which may be due to the second conductive patterns 323, such that the base layer 321 may have a flat shape. Accordingly, the adhesion strength between the bottom surface of the digitizer DZ and the third adhesive member AD3 can be further increased.

Figure 15:
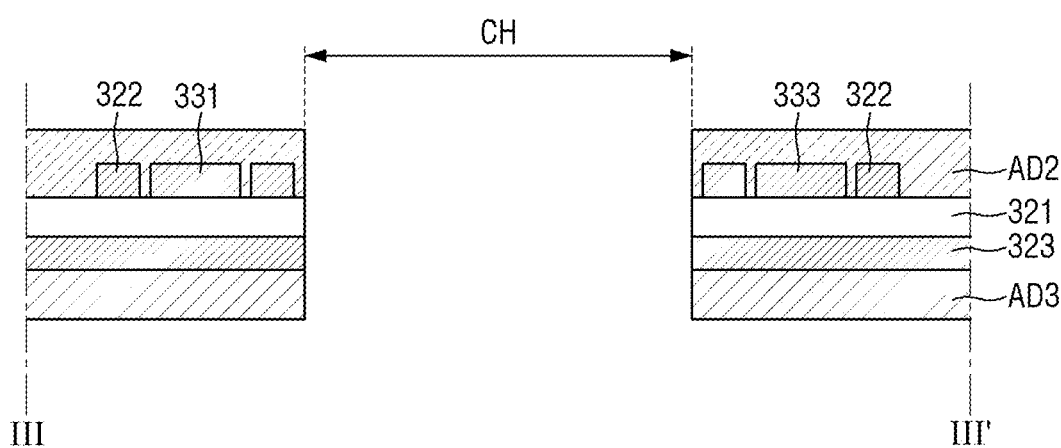
FIG. 15 is a cross-sectional view of the second adhesive member, the digitizer and the third adhesive member taken along line III-III' of FIG. 12.

FIG. 15 is a cross-sectional view of the second adhesive member AD2, the digitizer DZ and the third adhesive member AD3 taken along line III-III' of FIG. 10.

Referring to the cross-sectional view of FIG. 15, first conductive patterns 322 and first step-covering patterns 331, 332 and 333 may be disposed on the upper surface of the base layer 321 while second conductive patterns 323 may be disposed on the lower surface of the base layer 321.

The second conductive patterns 323 may be in direct contact with the lower surface of the base layer 321, may entirely cover the upper surface of the base layer 321, and may have a uniform thickness. It should be understood, however, that the present disclosure is not limited thereto.

A third adhesive member AD3 may be disposed on lower surfaces of the second conductive patterns 323. In the cross-sectional view, the lower surfaces of the second conductive patterns 323 have a flat shape, and thus the second conductive patterns 323 and the third adhesive member AD3 can have sufficient adhesion strength.

The first conductive patterns 322 and the first step-covering patterns 331, 332 and 333 may be disposed on the upper surface of the base layer 321. The first conductive patterns 322 and the first step-covering patterns 331, 332 and 333 may be spaced apart from each other. The distance between the adjacent first conductive patterns 322 and the first step-covering patterns 331, 332 and 333 may be equal to, but is not limited to, about 1 μm to about 8 μm.

The upper surfaces of the first conductive patterns 322 and the first step-covering patterns 331, 332 and 333 may have a flat shape. Although the first conductive patterns 322 and the first step-covering patterns 331, 332 and 333 have a shape of a plurality of quadrangles, the present disclosure is not limited thereto. In another embodiment, for example, the cross-sections of the first conductive patterns 322 may have various shapes, such as a triangle and a pentagon.

Although the first conductive patterns 322 have the same thickness in the drawings, the present disclosure is not limited thereto. In another embodiment, the thickness of each of the first conductive patterns 322 and the second conductive patterns 323 may have, but is not limited to, a value in the range of about 6 to about 13.0 μm.

A second adhesive member AD2 may be disposed on the upper surface of the base layer 321. More specifically, the second adhesive member AD2 may be disposed on the upper surface of the base layer 321 to cover side surfaces and upper surfaces of the first conductive patterns 322 and the first step-covering patterns 331, 332 and 333. As described above, by disposing the first step-covering patterns 331, 332 and 333 between the first conductive patterns 322, it is possible to reduce the level difference on the base layer 322 near the function hole CH created by the first conductive patterns 322. Accordingly, it is possible to prevent the problem that the second adhesive member AD2 is separated from the digitizer DZ and thus outside moisture permeates, which may arise because it is difficult to obtain a sufficient space for attaching the second adhesive member AD2 near the function hole CH or because a sufficient adhesion strength is not obtained between the digitizer DZ and the second adhesive member AD2.

Although the first conductive patterns 322 and the first step-covering patterns 331, 332 and 333 are spaced apart from each other in the example shown in the drawings, the present disclosure is not limited thereto. In another embodiment, for example, when the first step-covering patterns 331, 332 and 333 are made of an insulating material, even if the first conductive patterns 322 and the first step-covering patterns 331, 332 and 333 are in direct contact with each other, the current of the first conductive patterns 322 does not flow to the first step-covering patterns 331, 332 and 333. Accordingly, the spaces between the first conductive patterns 322 may be completely filled with the first step-covering patterns 331, 332 and 333. In this instance, there may be no level difference on the base layer 321 near the function hole CH which may be caused by the first conductive patterns 322, such that the base layer 321 may have a flat shape. Accordingly, the adhesion strength between the top surface of the digitizer DZ and the second adhesive member AD2 can be further increased.

Figure 16:
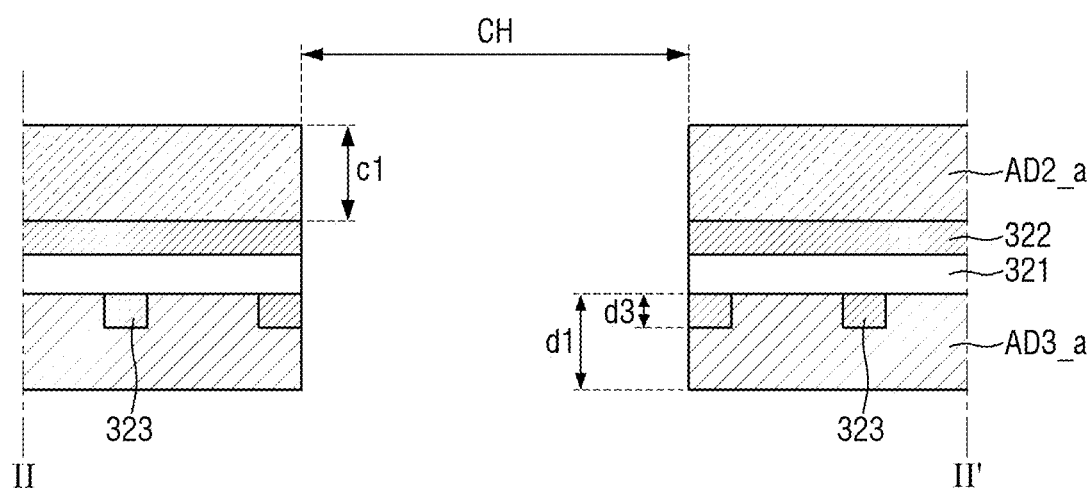
FIG. 16 is a cross-sectional view of a second adhesive member, a digitizer and a third adhesive member of a foldable display according to another embodiment, taken along the same plane as in FIG. 14.

FIG. 16 is a cross-sectional view of a second adhesive member, a digitizer and a third adhesive member of a foldable display according to another embodiment, taken along the same plane as in FIG. 14.

A display device 10 according to this embodiment is different from the display device according to the embodiment of FIG. 14 in that the step-covering patterns 331, 332, 333, 341, 342 and 343 are not disposed on the base layer 321, and that the thickness c1 of a second adhesive member AD2_a and the thickness d1 of a third adhesive member AD3_a are larger than those of FIG. 14, respectively. Descriptions will focus on differences, and the redundant description will be omitted.

The second adhesive member AD2_a and the third adhesive member AD3_a may have a thickness greater than or equal to twice the thicknesses of the first conductive patterns 322 and the second conductive patterns 323, respectively. More specifically, each of the second adhesive member AD2_a and the third adhesive member AD3_a may have a thickness of about 15 μm to about 50 μm. In an embodiment, for example, each of the second adhesive member AD2_a and the third adhesive member AD3_a may have a thickness of about 20 μm. It is advantageous for the adhesive member to have a sufficient thickness for attaching. By forming the second and third adhesive members AD2_a and AD3_a to have sufficient thicknesses, it is possible to effectively prevent that the adhesion force is reduced due to the level difference between the surfaces to which the second and third adhesive members AD2_a and AD3_a are attached.

In an embodiment, for example, as shown in FIG. 16, it may be assumed that the thickness d3 of the second conductive patterns 323 in the thickness direction (i.e., DR3) is about 8 μm. Based on the assumption, the third adhesive member AD3_a having the thickness d1 of about 10 μm will be compared with the third adhesive member AD3_a having the thickness d1 of about 20 μm later.

The level difference on the base layer 321 caused by the second conductive patterns 323 are equal to the thickness d3 of the second conductive patterns 323. When the thickness d1 of the third adhesive member AD3_a is about 10 μm, the ratio of the level difference to the thickness of the third adhesive member AD3_a (i.e., d3/d1) is 80%. On the other hand, when the thickness d1 of the third adhesive member AD3_a is about 20 μm, the ratio of the level difference to the thickness of the third adhesive member AD3_a is 40%. Accordingly, despite the same level difference, the decrease in the adhesion strength due to the level difference may be reduced as the thickness of the third adhesive member AD3_a increases. Therefore, by increasing the thickness of the third adhesive member AD3_a, sufficient adhesion strength can be obtained between the third adhesive member AD3_a and the digitizer DZ, so that it is possible to prevent that the digitizer DZ and the adhesive member are separated from each other near the function hole CH and the outside moisture permeates into the foldable display device 10. By increasing the thickness c1 of the second adhesive member AD2_a to about 15 to about 50 μm, sufficient adhesion strength can be obtained between the second adhesive member AD2_a and the digitizer DZ, so that it is possible to prevent that the digitizer DZ and the adhesive member are separated from each other near the function hole CH and the outside moisture permeates into the foldable display device 10.

Figure 17:
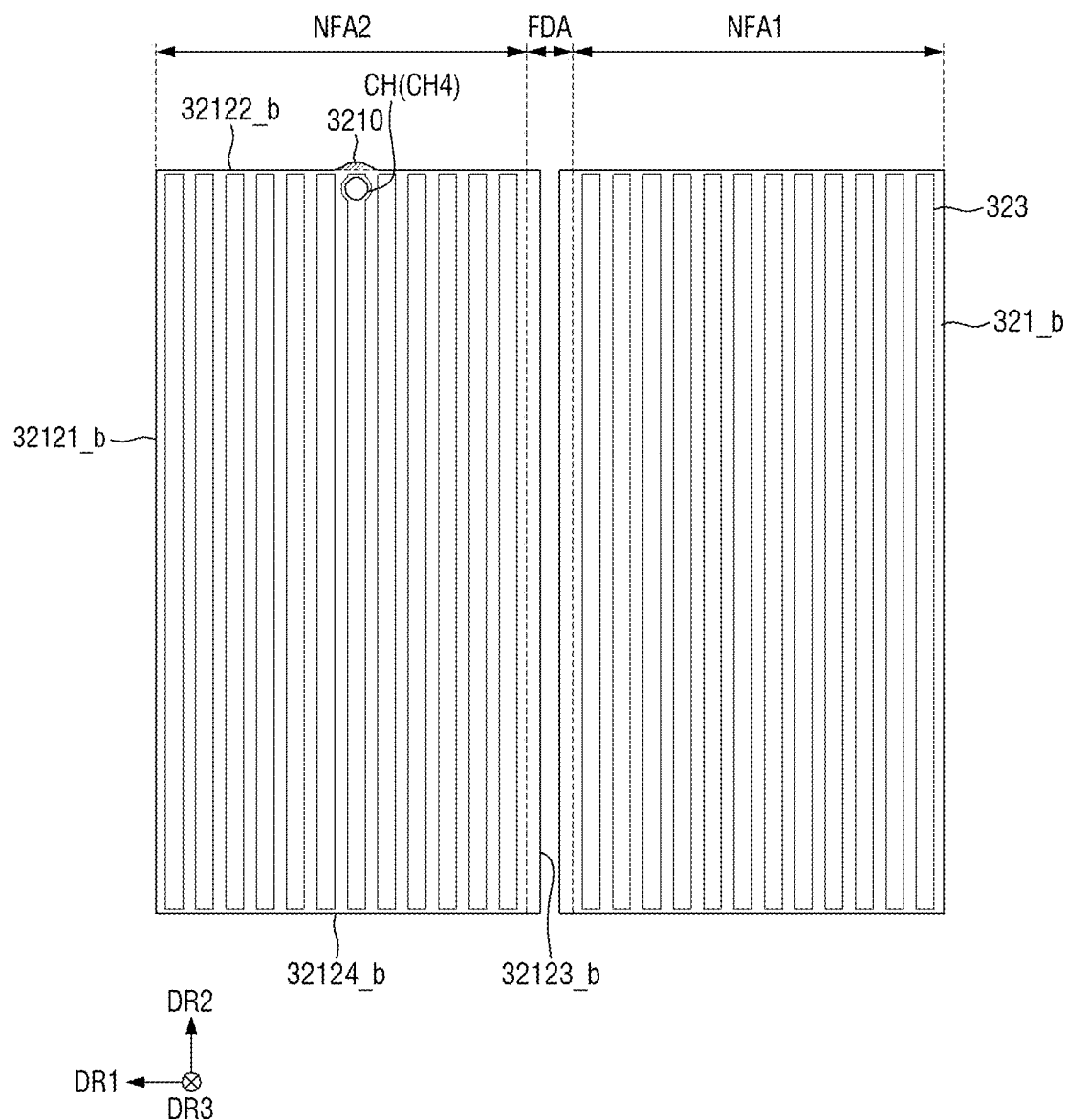
FIG. 17 is a plan view showing the bottom surface of a digitizer of a foldable display device according to yet another embodiment.
Figure 18:
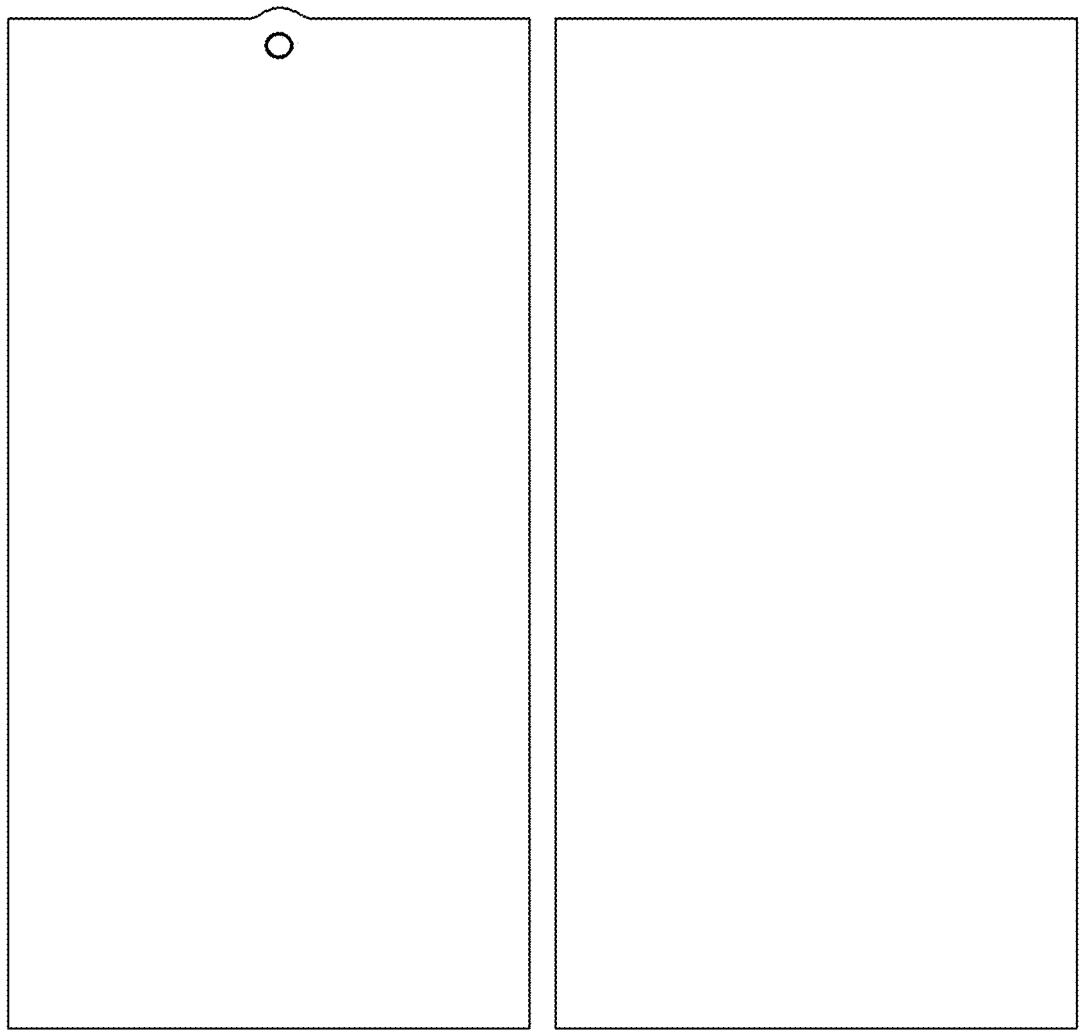
FIG. 18 is a plan view showing the lower surface of a third adhesive member of a foldable display device according to yet another embodiment.

FIG. 17 is a plan view showing the bottom surface of a digitizer of a foldable display device according to yet another embodiment. FIG. 18 is a plan view showing the lower surface of a third adhesive member of a foldable display device according to yet another embodiment. FIG.

19 is a view schematically showing a foldable display device according to yet another embodiment.

A display device 10 according to this embodiment is different from that of the embodiment of FIG. 14 in that the step-covering patterns 331, 332, 333, 341, 342 and 343 are not disposed on a base layer 321_b, and that the base layer 321_b has a protrusion 3210 near the function hole CH. Descriptions will focus on differences, and the redundant description will be omitted.

Referring to FIGS. 17 and 18, the base layer 321_b may include a first base layer and a second base layer. Although the first base layer and the second base layer are spaced apart from each other in the drawings, the present disclosure is not limited thereto. In another embodiment, for example, the first base layer and the second base layer may be connected with each other as a single piece. The first base layer and the second base layer may be different from each other in that one of them includes the function hole whereas the other does not. The first base layer may include no function hole, whereas the second base layer may include a function hole.

The side of the second base layer in the first direction DR1 is defined as a first side 32121_b, and the sides are defined as a second side 32122_b, a third side 32123_b and a fourth side 32124_b, respectively, in the clockwise direction from the first side surface 32121_b.

The base layer 321_b may define a function hole therein. Specifically, the base layer 321_b may define a digitizer hole CH4 penetrating through the base layer 321_b. The digitizer hole CH4 may be located adjacent to the second side 32122_b in the second base layer. Specifically, the shortest distance from the digitizer hole CH4 to the second side 32122_b may be smaller than each of the shortest distances from the digitizer hole CH4 to the first side 32121_b, the third side 32123_b and the fourth side 32124_b.

The second side 32122_b of the base layer 321_b includes a protrusion 3210 having a shape protruding in the second direction DR2 opposite to the function hole CH. An edge of the upper surface of the protrusion 3210 may be rounded, but the present disclosure is not limited thereto. In another embodiment, for example, the edge of the protrusion 3210 may be a straight line.

As the base layer 321_b includes the protrusion 3210, when the second adhesive member AD2_b and the third adhesive member AD3_b are disposed on the upper and lower surfaces of the base layer 321_b, respectively, a sufficient space can be obtained near the function hole CH, in which the second adhesive member AD2_b and the third adhesive member AD3_b can be disposed, so that it is possible to obtain the additional widths of the second adhesive member AD2_b and the third adhesive member AD3_b. Accordingly, the second adhesive member AD2_b and the third adhesive member AD3_b can be attached to the upper and lower surfaces of the base layer 321_b near the function hole CH with sufficient widths, so that it is possible to obtain a sufficient coupling force between the digitizer DZ and the second adhesive member AD2_b and between the digitizer DZ and the third adhesive member AD3_b. Accordingly, it is possible to prevent the problem that moisture penetrates from the outside due to poor adhesion between the digitizer DZ and the second adhesive member AD2_b and between the digitizer DZ and the third adhesive member AD3_b near the function hole CH.

The entire upper surface of the base layer 321_b may be disposed inside the lower surface of the panel support SS in the third direction DR3. Accordingly, the protrusion 3210 may also be disposed inside the lower surface of the panel support SS in line with it in the third direction DR3 (i.e., in a plan view). Accordingly, the entire surface of the digitizer DZ may be coupled with the lower surface of the panel support SS by the second adhesive member AD2_b.

Referring to FIG. 18, as the base layer 321_b of the digitizer includes the protrusion 3210, the third adhesive member AD3_b in direct contact with the bottom surface of the digitizer may also have a protrusion corresponding to the protrusion 3210. In addition, the second adhesive member AD2_b may also have substantially the same shape as the third adhesive member AD3_b, or may have a protrusion corresponding to the protrusion 3210 and may be smaller than the third adhesive member AD3_b. As such, a sufficient area can be obtained due to the protrusion 3210 where the second adhesive member AD2_b and the third adhesive member AD3_b can be in contact with the digitizer, so that it is possible to obtain a sufficient adhesion strength between the digitizer DZ and the second adhesive member AD2_b and between the digitizer DZ and the third adhesive member AD3_b.

Figure 19:
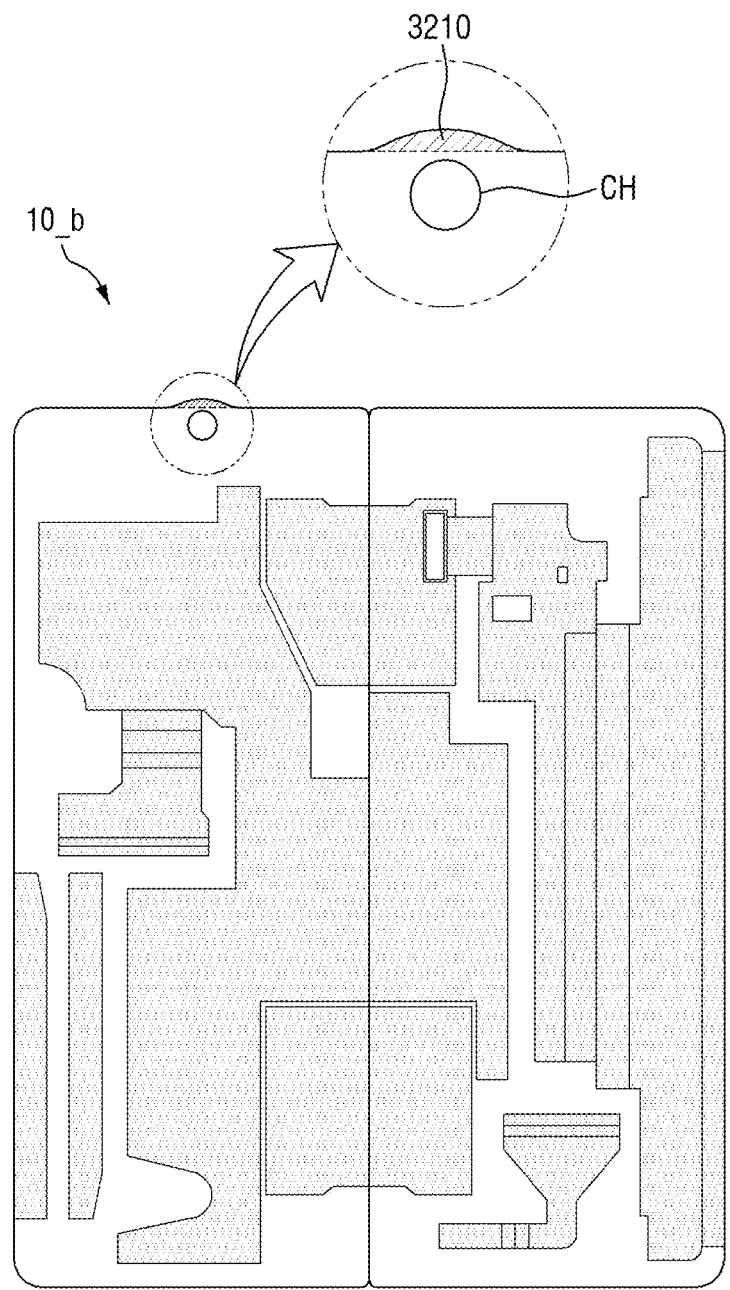
FIG. 19 is a view schematically showing a foldable display device according to yet another embodiment.

Referring to FIG. 19, in some embodiments, the exterior of a foldable display device 10 may have a protrusion as well as a base layer 321_b. In this instance, every element of the display module DM may have a protrusion that is in line with a protrusion 3210 of the base layer 321_b in the third direction DR3, in addition to the base layer 321_b. The protrusion 3210 according to this embodiment may be equally applied to the other embodiments described above.

Features of various embodiments of the disclosure may be combined partially or totally. As will be clearly appreciated by those skilled in the art, technically various interactions and operations are possible. Various embodiments can be practiced individually or in combination.

In concluding the detailed description, those skilled in the art will appreciate that many variations and modifications can be made to the preferred embodiments without substantially departing from the principles of the invention. Therefore, the disclosed preferred embodiments of the invention are used in a generic and descriptive sense only and not for purposes of limitation.

What is claimed is:
1. A foldable display device comprising:
a display panel;
a digitizer disposed on a surface of the display panel and comprising a base layer, a plurality of first conductive patterns disposed between the base layer and the display panel, and a plurality of second conductive patterns disposed on an opposite side to the first conductive patterns with the base layer interposed therebetween;
a first adhesive member disposed between the digitizer and the display panel and in direct contact with the digitizer; and
a second adhesive member disposed on an opposite side to the first adhesive member with the digitizer interposed therebetween and in direct contact with the digitizer,
wherein the digitizer further comprises a digitizer hole penetrating through the digitizer, a first step-covering pattern disposed in a same layer with the first conductive patterns, and a second step-covering pattern disposed in a same layer with the second conductive patterns,
wherein the first adhesive member defines a first adhesive member hole penetrating through the first adhesive member and in line with the digitizer hole in a thickness direction, and wherein the second adhesive member defines a second adhesive member hole penetrating through the second adhesive member and in line with the digitizer hole in the thickness direction.

2. The device of claim 1, wherein the first step-covering pattern is disposed between two adjacent first conductive patterns of the plurality of first conductive patterns, and wherein the second step-covering pattern is disposed between two adjacent second conductive patterns of the plurality of second conductive patterns.

3. The device of claim 2, wherein the first step-covering pattern is spaced apart from the first conductive patterns, and wherein the second step-covering pattern is spaced apart from the second conductive patterns.

4. The device of claim 3, wherein the first step-covering pattern comprises a same material as the first conductive patterns, and wherein the second step-covering pattern comprises a same material as the second conductive patterns.

5. The device of claim 3, wherein a surface of the first step-covering pattern is in direct contact with the base layer while an opposite surface of the first step-covering pattern is in direct contact with the first adhesive member, and wherein a surface of the second step-covering pattern is in direct contact with the base layer while an opposite surface of the second step-covering pattern is in direct contact with the second adhesive member.

6. The device of claim 5, wherein the opposite surface of the first step-covering pattern has a flat shape, and wherein the opposite surface of the second step-covering pattern has a flat shape.

7. The device of claim 3, wherein the first step-covering pattern and the first conductive patterns have a same thickness, and wherein the second step-covering pattern and the second conductive patterns have a same thickness.

8. The device of claim 3, wherein a shortest distance from the first step-covering pattern to the adjacent first conductive patterns is about 1 to about 8 micrometers (μm), and wherein a shortest distance from the second step-covering pattern to the adjacent second conductive patterns is about 1 to about 8 μm.

9. The device of claim 2, wherein a side surface of the first step-covering pattern is in direct contact with a side surface of at least one of the adjacent first conductive patterns, and wherein a side surface of the second step-covering pattern is in direct contact with a side surface of at least one of the adjacent second conductive patterns.

10. The device of claim 9, wherein each of the first step-covering pattern and the second step-covering pattern comprise an insulating material.

11. The device of claim 10, wherein the first step-covering pattern and the first conductive pattern have a same thickness, and wherein the second step-covering pattern and the second conductive pattern have a same thickness.

12. The device of claim 2, wherein the base layer comprises a protrusion having a shape protruding from an edge of the base layer located at a shortest distance from the digitizer hole toward an outside of the base layer.

13. The device of claim 1, further comprising:
a panel support disposed between the display panel and the digitizer; and
a metal support disposed on a surface of the panel support with the digitizer interposed therebetween,
wherein the panel support defines a panel support hole that penetrates through the panel support and is in line with the digitizer hole in the thickness direction, and
wherein the metal support defines a metal support hole that penetrates through the metal support and is in line with the digitizer hole in the thickness direction.

14. The device of claim 13, further comprising:
a barrier member disposed between the display panel and the digitizer,
wherein the barrier member defines a barrier member hole that penetrates through the barrier member and is in line with the digitizer hole in the thickness direction.

15. A foldable display device comprising:
a display panel;
a digitizer disposed on a surface of the display panel and comprising a base layer, a plurality of first conductive patterns disposed between the base layer and the display panel, and a plurality of second conductive patterns disposed on an opposite side to the first conductive patterns with the base layer interposed therebetween;
a first adhesive member disposed between the digitizer and the display panel and in direct contact with the digitizer; and
a second adhesive member disposed on an opposite side to the first adhesive member with the digitizer interposed therebetween and in direct contact with the digitizer,
wherein the digitizer defines a digitizer hole penetrating through the digitizer,
wherein the first adhesive member defines a first adhesive member hole that penetrates through the first adhesive member and is in line with the digitizer hole in a thickness direction,
wherein the second adhesive member defines a second adhesive member hole that penetrates through the second adhesive member and is in line with the digitizer hole in the thickness direction, and
wherein each of the first adhesive member and the second adhesive member has a thickness of about 15 to about 50 μm.

16. The device of claim 15, wherein a surface of each of the first conductive patterns is in direct contact with the base layer, and the first adhesive member covers a remaining surface of each of the first conductive patterns, and
wherein a surface of each of the second conductive patterns is in direct contact with the base layer, and the second adhesive member covers a remaining surface of each of the second conductive patterns.

17. The device of claim 15, wherein the base layer comprises a protrusion having a shape protruding from an edge of the base layer located at a shortest distance from the digitizer hole toward an outside of the base layer.

18. A foldable display device comprising:
a display panel;
a digitizer disposed on a surface of the display panel and comprising a base layer, a plurality of first conductive patterns disposed between the base layer and the display panel, and a plurality of second conductive patterns disposed on an opposite side to the first conductive patterns with the base layer interposed therebetween;
a first adhesive member disposed between the digitizer and the display panel and in direct contact with the digitizer; and
a second adhesive member disposed on an opposite side to the first adhesive member with the digitizer interposed therebetween and in direct contact with the digitizer, wherein the digitizer defines a digitizer hole penetrating through the digitizer, and wherein the base layer comprises a protrusion having a shape protruding from an edge of the base layer located at a shortest distance from the digitizer hole toward an outside of the base layer.

19. The device of claim 18, further comprising:

a panel support disposed between the display panel and the digitizer, wherein a side surface of the protrusion is disposed more inward than a side surface of the panel support corresponding thereto in a view in a thickness direction.

20. The device of claim 19, wherein the panel support defines a panel support hole that penetrates through the panel support and overlaps with the digitizer hole in the thickness direction, and wherein an edge of the panel support located at a shortest distance from the panel support hole has a shape protruding outward from the panel support hole.

\* \* \* \* \*